(12) United States Patent
Sun et al.

(10) Patent No.: US 11,838,917 B2
(45) Date of Patent: Dec. 5, 2023

(54) CROSS-CARRIER DOWNLINK CONTROL INFORMATION SCHEDULING

(71) Applicant: QUALCOMM Incorporated, San Diego, CA (US)

(72) Inventors: Jing Sun, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/238,104

(22) Filed: Apr. 22, 2021

(65) Prior Publication Data

US 2021/0337577 A1 Oct. 28, 2021

Related U.S. Application Data

(60) Provisional application No. 63/014,656, filed on Apr. 23, 2020.

(51) Int. Cl.
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
None
See application file for complete search history.

(56) References Cited

U.S. PATENT DOCUMENTS

| | | | |
|---|---|---|---|
| 2018/0338307 A1* | 11/2018 | Feng | H04W 72/23 |
| 2018/0367257 A1* | 12/2018 | Li | H04L 1/189 |
| 2019/0150125 A1* | 5/2019 | Bagheri | H04L 5/0044 370/336 |
| 2019/0261332 A1* | 8/2019 | Li | H04W 72/535 |
| 2020/0389870 A1* | 12/2020 | Shin | H04W 48/08 |
| 2021/0022079 A1* | 1/2021 | Shen | H04W 52/0216 |
| 2022/0039140 A1* | 2/2022 | Yi | H04W 72/23 |

\* cited by examiner

*Primary Examiner* — Phirin Sam
(74) *Attorney, Agent, or Firm* — Loza & Loza, LLP/Qualcomm Incorporated

(57) ABSTRACT

In cross-carrier scheduling of DCIs on a data channel, a base station may transmit a first DCI on a first radio frequency (RF) carrier, where the first DCI schedules a data channel of a second RF carrier (and optionally indicates that the base station will transmit at least one DCI on the data channel of the second RF carrier). In some examples, the base station may transmit the first DCI in a control channel of the first RF carrier. In some examples, the base station may transmit the first DCI in a data channel of the first RF carrier. In some examples, the base station may transmit, in a data channel of the second RF carrier, a second DCI that indicates that the base station will transmit at least one DCI in the data channel of the first RF carrier.

29 Claims, 17 Drawing Sheets

CROSS-CARRIER DOWNLINK CONTROL INFORMATION SCHEDULING

CROSS-REFERENCE TO RELATED APPLICATION(S)

The present application for patent claims priority to and the benefit of U.S. Provisional Application No. 63/014,656, titled "CROSS-CARRIER DOWNLINK CONTROL INFORMATION SCHEDULING" filed Apr. 23, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to scheduling downlink control information across carriers.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving a first downlink control information (DCI) on a first radio frequency (RF) carrier of a plurality of component carriers for the user equipment. The first DCI may schedule a first data channel on a second RF carrier of the plurality of component carriers. The method may also include receiving a second DCI on the second RF carrier and identifying at least one resource based on at least one of the first DCI, the second DCI, or a combination thereof. The method may further include communicating information via the at least one resource.

In some examples, a user equipment may include a transceiver, a memory, and a processor coupled to the transceiver and the memory. The processor and the memory may be configured to receive a first downlink control information (DCI) via the transceiver on a first radio frequency (RF) carrier of a plurality of component carriers for the user equipment. The first DCI may schedule a first data channel on a second RF carrier of the plurality of component carriers. The processor and the memory may also be configured to receive a second DCI via the transceiver on the second RF carrier and identify at least one resource based on at least one of the first DCI, the second DCI, or a combination thereof. The processor and the memory may further be configured to communicate information via the transceiver on the at least one resource.

In some examples, a user equipment may include means for receiving a first downlink control information (DCI) on a first radio frequency (RF) carrier of a plurality of component carriers for the user equipment. The first DCI may schedule a first data channel on a second RF carrier of the plurality of component carriers. The user equipment may also include means for receiving a second DCI on the second RF carrier and means for identifying at least one resource based on at least one of the first DCI, the second DCI, or a combination thereof. The user equipment may further include means for communicating information via the at least one resource.

In some examples, an article of manufacture for use by a user equipment includes a non-transitory computer-readable medium having stored therein instructions executable by one or more processors of the user equipment to receive a first downlink control information (DCI) on a first radio frequency (RF) carrier of a plurality of component carriers for the user equipment. The first DCI may schedule a first data channel on a second RF carrier of the plurality of component carriers. The computer-readable medium may also have stored therein instructions executable by one or more processors of the user equipment to receive a second DCI on the second RF carrier and identify at least one resource based on at least one of the first DCI, the second DCI, or a combination thereof. The computer-readable medium may also have stored therein instructions executable by one or more processors of the user equipment to communicate information via the at least one resource.

In some examples, a method for wireless communication at a user equipment is disclosed. The method may include receiving a first downlink control information (DCI) on a first data channel of a first radio frequency (RF) carrier of a plurality of component carriers for the user equipment. The first DCI may schedule a second data channel on a second RF carrier of the plurality of component carriers. The method may also include identifying at least one resource associated with the second data channel and communicating information via the at least one resource.

In some examples, a user equipment may include a transceiver, a memory, and a processor coupled to the transceiver and the memory. The processor and the memory may be configured to receive a first downlink control information (DCI) via the transceiver on a first data channel of a first radio frequency (RF) carrier of a plurality of component carriers for the user equipment. The first DCI may schedule a second data channel on a second RF carrier of the plurality of component carriers. The processor and the memory may also be configured to identify at least one resource associated with the second data channel and communicate information via the transceiver on the at least one resource.

In some examples, a user equipment may include means for receiving a first downlink control information (DCI) on a first data channel of a first radio frequency (RF) carrier of a plurality of component carriers for the user equipment. The first DCI may schedule a second data channel on a second RF carrier of the plurality of component carriers. The user equipment may also include means for identifying at least one resource associated with the second data channel and means for communicating information via the at least one resource.

In some examples, an article of manufacture for use by a user equipment includes a non-transitory computer-readable medium having stored therein instructions executable by one or more processors of the user equipment to receive a first downlink control information (DCI) on a first data channel of a first radio frequency (RF) carrier of a plurality of component carriers for the user equipment. The first DCI may schedule a second data channel on a second RF carrier of the plurality of component carriers. The computer-readable medium may also have stored therein instructions executable by one or more processors of the user equipment to identify at least one resource associated with the second data channel and communicate information via the at least one resource.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
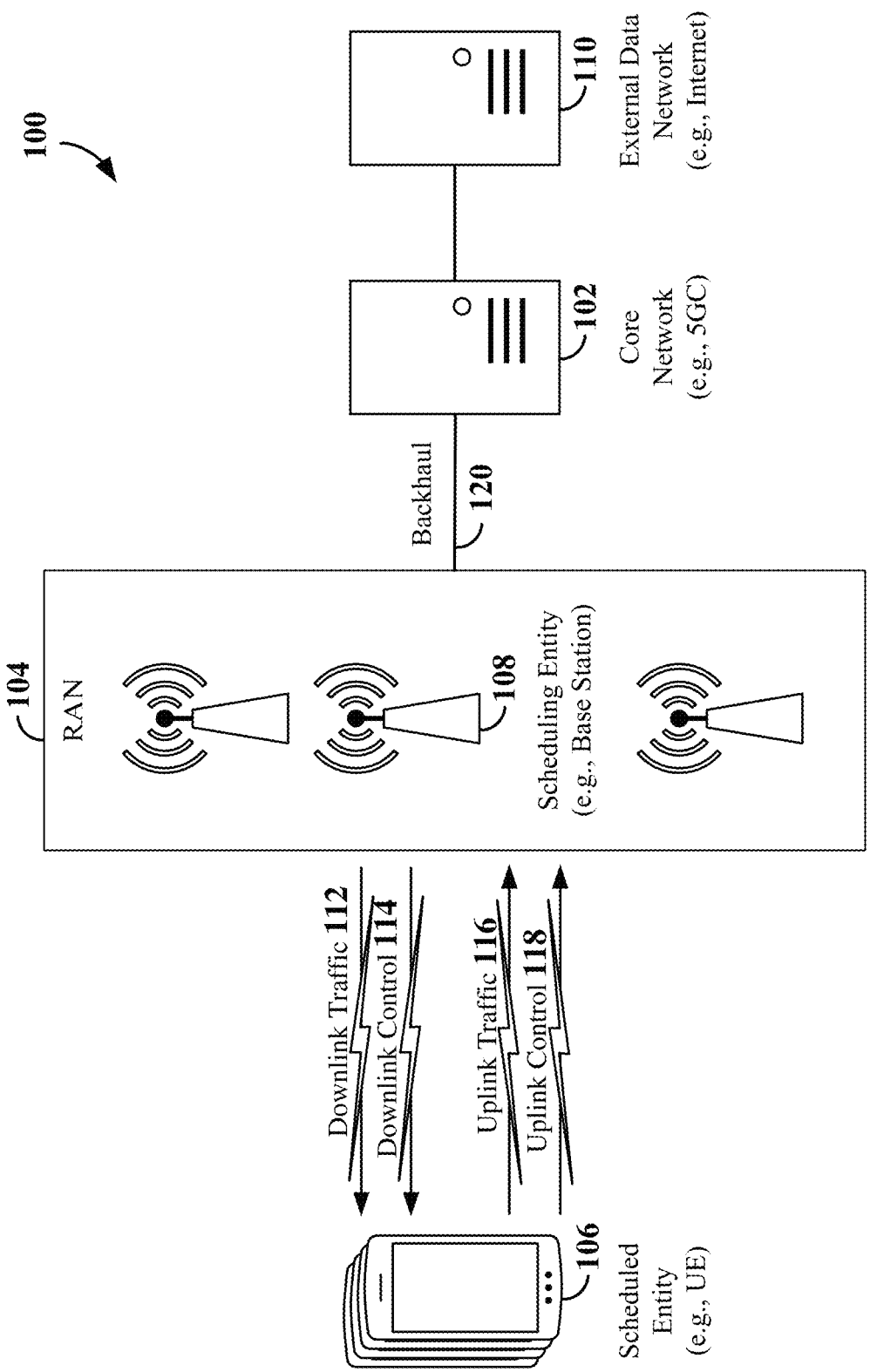
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to cross-carrier scheduling and transmission of downlink control information (DCI) on a data channel. For example, a base station may transmit a first DCI on a first radio frequency (RF) carrier, where the first DCI schedules a data channel of a second RF carrier (i.e., the first DCI provides cross-carrier scheduling). In addition, the base station may transmit a DCI on a data channel of the second RF carrier. In some examples, the first DCI may indicate that the base station will transmit a DCI on a data channel of the second RF carrier. In some examples, the RF carriers are component carriers of a carrier aggregation configuration.

In some examples, the base station transmits the first DCI on a control channel of the first RF carrier. Thus, in this case, a DCI in the control channel of the first RF carrier is used to perform cross-carrier scheduling.

In some examples, the base station transmits the first DCI on a data channel of the first RF carrier. Thus, in this case, a DCI in the data channel of the first RF carrier is used to perform cross-carrier scheduling.

In some examples, the base station may transmit, in a data channel of the second RF carrier, a second DCI that schedules a data channel of the first RF carrier and/or indicates that the base station will transmit at least one DCI in a data channel of the first RF carrier. Thus, in this case, a DCI in the data channel of the second RF carrier is used to perform cross-carrier scheduling.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
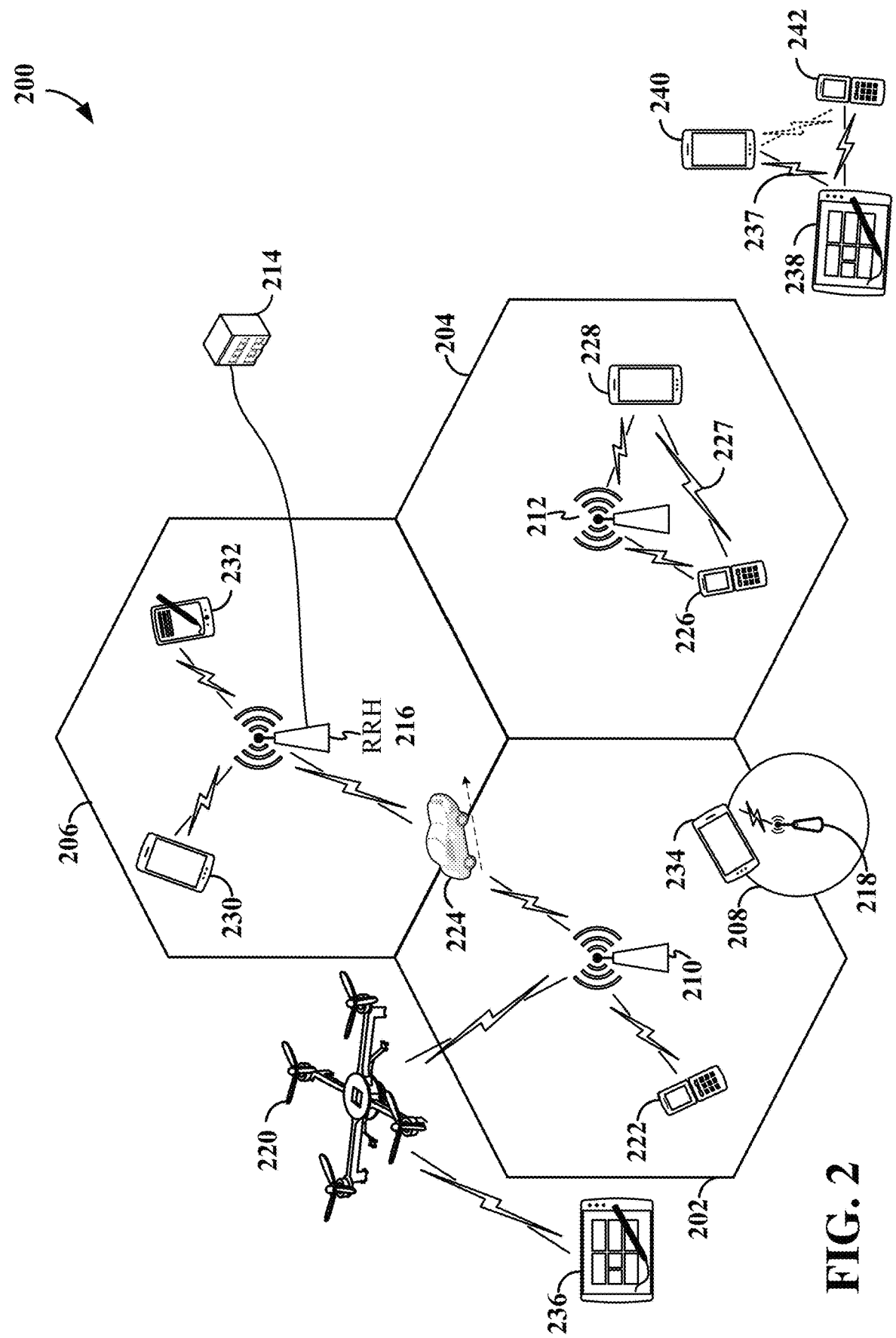
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
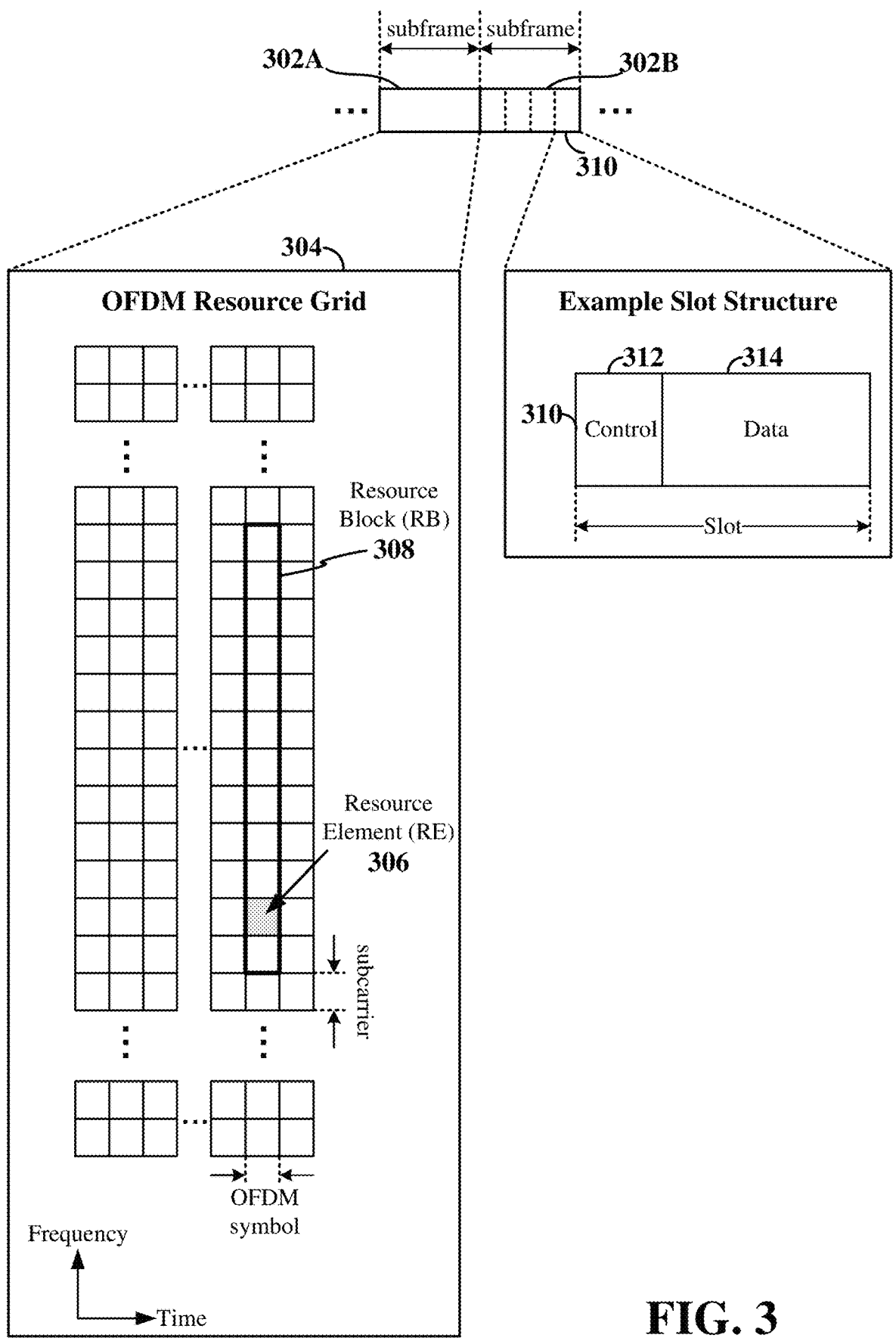
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
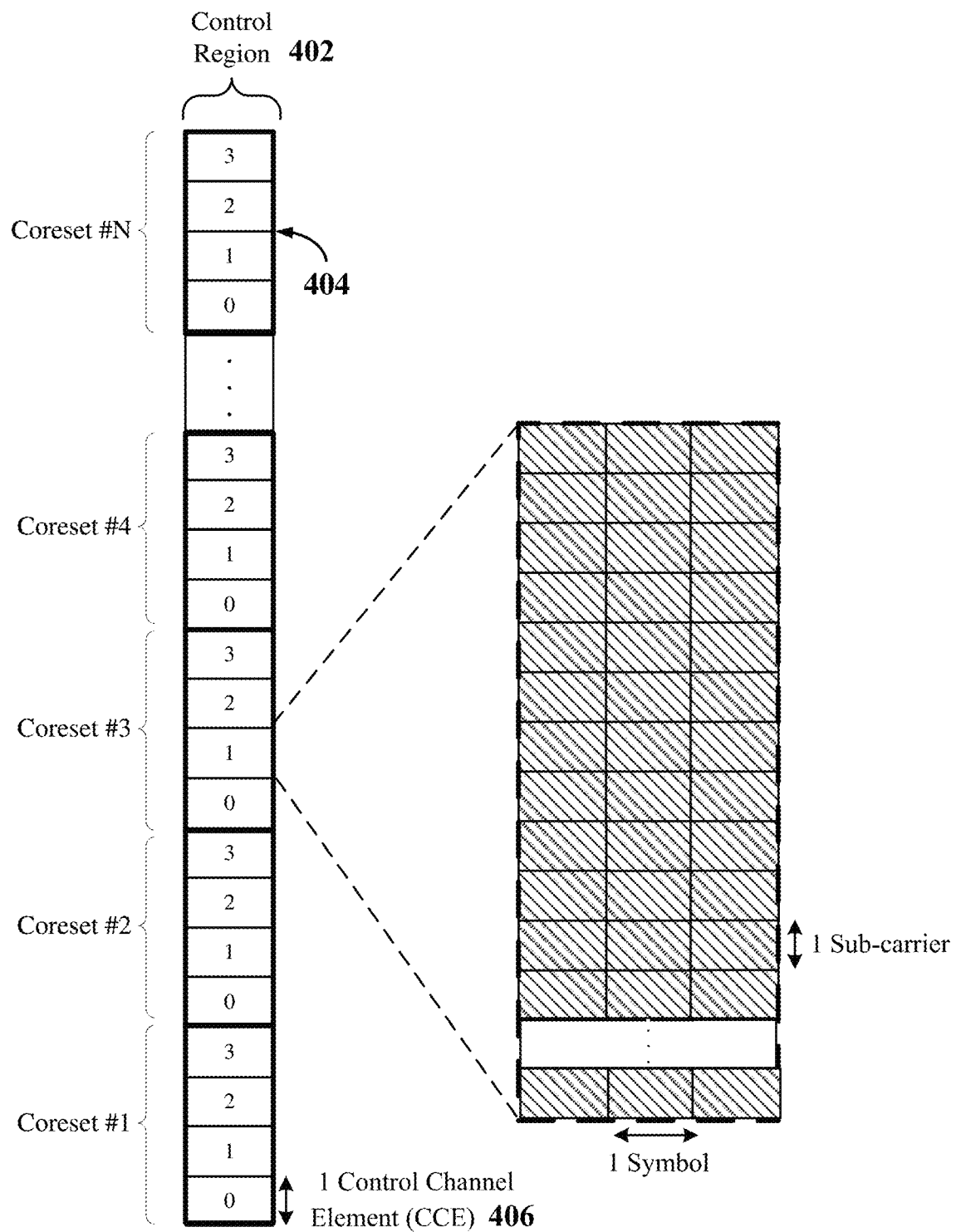
FIG. 4 is a diagram illustrating an example of a control region of a slot according to some aspects.

FIG. 4 is a schematic illustration of an example of a downlink (DL) control region 402 of a slot according to some aspects. The DL control region 402 may correspond, for example, to the control region 312 illustrated in FIG. 3. As discussed above, the DL control region 402 may carry a PDCCH that includes one or more DCIs.

The DL control region 402 includes a plurality of CORESETs 404 indexed as CORESET #1-CORESET #N. Each CORESET 404 includes a number of sub-carriers in the frequency domain and one or more symbols in the time domain. In the example of FIG. 4, each CORESET 404 includes at least one control channel element (CCE) 406 having dimensions in both frequency and time, sized to span across at least three OFDM symbols. A CORESET 404 having a size that spans across two or more OFDM symbols may be beneficial for use over a relatively small system bandwidth (e.g., 5 MHz). However, a one-symbol CORESET may also be possible.

A CORESET 404 may be configured for group common control information or UE-specific control information and may be used for transmission of a PDCCH including the group common control information or UE-specific control information to a set of one or more UEs. The UE may monitor one or more CORESETs 404 that the UE is configured to monitor for the UE-specific or group common control information (e.g., on a PDCCH).

In some examples, the PDCCH may be constructed from a variable number of CCEs, depending on the PDCCH format (or aggregation level). Each PDCCH format (or aggregation level) supports a different DCI length. In some examples, PDCCH aggregation levels of 1, 2, 4, 8, and 16 may be supported, corresponding to 1, 2, 4, 8, or 16 contiguous CCEs, respectively.

Since the UE may be unaware of the particular aggregation level of the PDCCH or whether multiple PDCCHs may exist for the UE in the slot, the UE may perform blind decoding of various PDCCH candidates within the first N control OFDM symbols (as indicated by the slot format of the slot) based on an expected radio network temporary identifier (RNTI) (e.g., UE-specific RNTI or group RNTI). Each PDCCH candidate includes a collection of one or more consecutive CCEs based on an assumed DCI length (e.g., PDCCH aggregation level).

To limit the number of blind decodes, search spaces defining UE-specific search spaces (USSs) and common search spaces (CSSs) may be defined. The search space sets (e.g., USSs and CSSs) configured for a UE limit the number of blind decodes that the UE performs for each PDCCH format combination. The starting point (offset or index) of a UE-specific search space may be different for each UE and each UE may have multiple UE-specific search spaces (e.g., one for each aggregation level). The common search space sets consist of CCEs used for sending control information that is common to a group of UEs or to all UEs. Thus, the common search space sets are monitored by multiple UEs in a cell. The starting point (offset or index) of a search space set for group common control information may be the same for all UEs in the group and there may be multiple search space sets defined for group common control information (e.g., one for each configured aggregation level for the group of UEs). The UE may perform blind decoding over all aggregation levels and corresponding USSs or CSSs to determine whether at least one valid DCI exists for the UE.

A UE may monitor a search space for downlink assignments and uplink grants relating to a particular component carrier for the UE. For example, the UE may monitor the search space for a PDCCH that includes a DCI that schedules a PDSCH in the same slot or in a different slot for that component carrier. The DCI includes a frequency domain resource assignment and a time domain resource assignment for the PDSCH and other information (e.g., MCS etc.) that enables the UE to decode the PDSCH.

Wireless communication networks such as NR networks may support carrier aggregation in a multi-cell transmission environment where, for example, different base stations and/or different transmission and reception points (TRPs) may transmit on different component carriers. In some aspects, the term component carrier may refer to a carrier frequency (or band) utilized for communication within a cell. In some examples, different TRPs may be associated with a single serving cell (e.g., a single base station). In some examples, different TRPs may be associated with different serving cells (e.g., different base stations may employ different TRPs).

Figure 5:
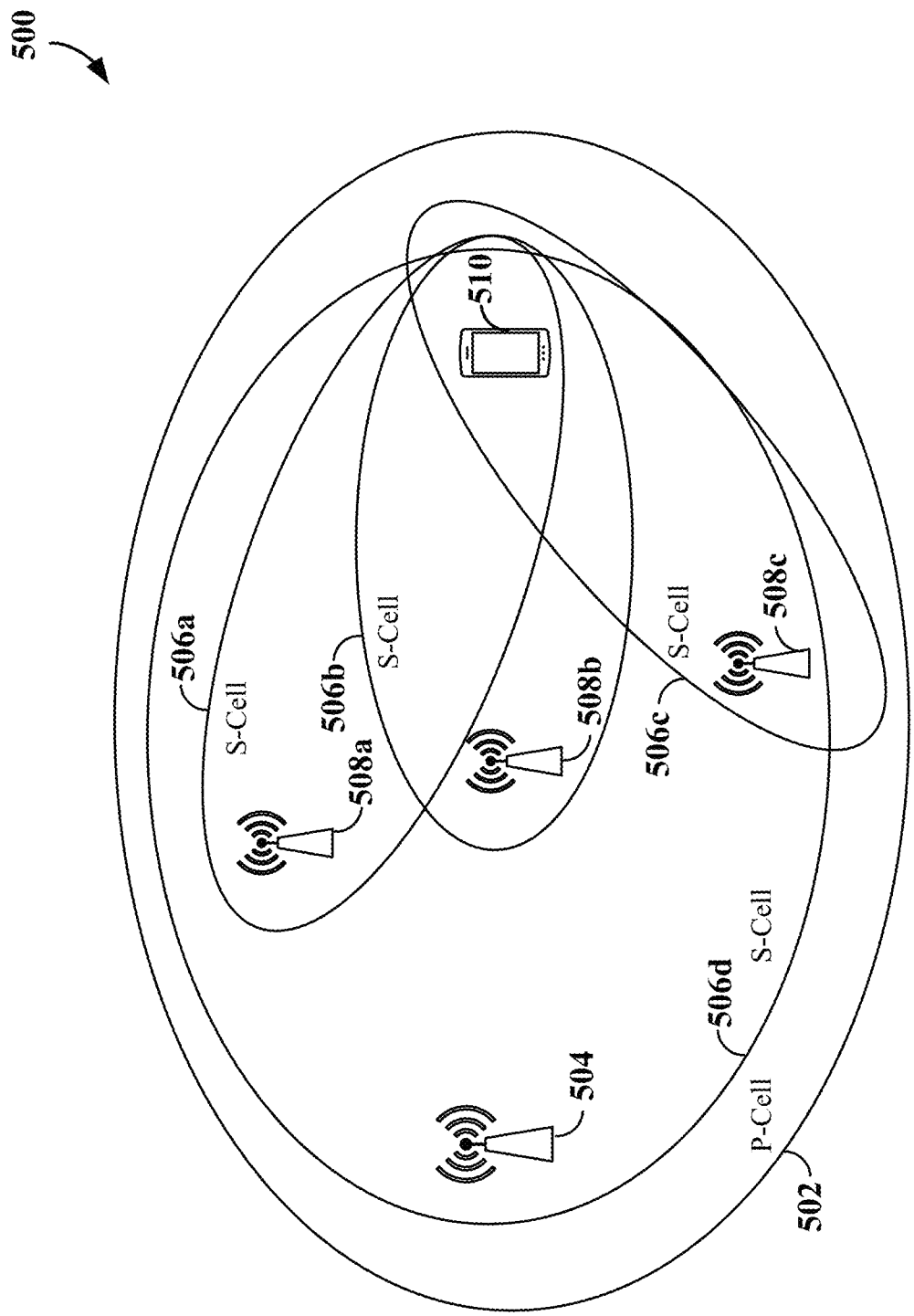
FIG. 5 is a diagram of an example of multiple serving cells according to some aspects.

An example of a multi-cell transmission environment 500 is shown in FIG. 5. The multi-cell transmission environment 500 includes a primary serving cell (PCell) 502 and one or more secondary serving cells (SCells) 506a, 506b, 506c, and 506d. The PCell 502 may be referred to as the anchor cell that provides a radio resource control (RRC) connection to a UE (e.g., the UE 510). In some examples, the PCell and one or more of the SCells may be co-located. For example, a TRP for the PCell and a TRP for an SCell may be installed at the same location. In some examples, the UE 510 may correspond to any of the UEs or scheduled entities shown in any of FIGS. 1, 2, 10, and 11.

When carrier aggregation is used in the multi-cell transmission environment 500, one or more of the SCells 506a-506d may be activated or added to the PCell 502 to form the serving cells serving the UE 510. In this case, each of these serving cells corresponds to a component carrier (CC). The CC of the PCell 502 may be referred to as a primary CC, and the CC of an SCell (e.g., SCell 506a-506d) may be referred to as a secondary CC. Each of the PCell 502 and the SCells 506a-506d may be served by a respective base station or scheduling entity as described in FIGS. 1 and 2. In the example of FIG. 5, the PCell 502 is served by the base station 504 and the SCells 506a-506c are each served by a respective base station 508a-508c. In addition, the SCell 506d is co-located with the PCell 502. For example, the base station 504 may include multiple TRPs, each supporting a different carrier. The coverage of the PCell 502 and the coverage of the SCell 506d may differ as shown in FIG. 5. For example, component carriers in different frequency bands may experience different path loss and, thus, provide different coverage. In some examples, the base station 504 and 508a-508c may correspond to any of the base stations or scheduling entities shown in any of FIGS. 1, 2, 5, and 16.

In some examples, the PCell 502 may utilize a first radio access technology (RAT), such as LTE, while one or more of the SCells 506 may utilize a second RAT, such as NR. In this case, the multi-cell transmission environment may be referred to as a multi-RAT-dual connectivity (MR-DC) environment. In some examples, the PCell 502 may be a low band cell, and the SCells 506 may be high band cells. A low band (LB) cell uses a CC in a frequency band lower than that of the high band cells. For example, the high band cells may use a mmWave CC, and the low band cell may use a CC in a band (e.g., sub-6 GHz band) that is lower than mmWave. In general, a cell using a mmWave CC can provide greater bandwidth than a cell using a low band CC. In addition, when using above-6 GHz frequency (e.g., mmWave) carriers, beamforming may be used to transmit and receive signals.

Figure 6:
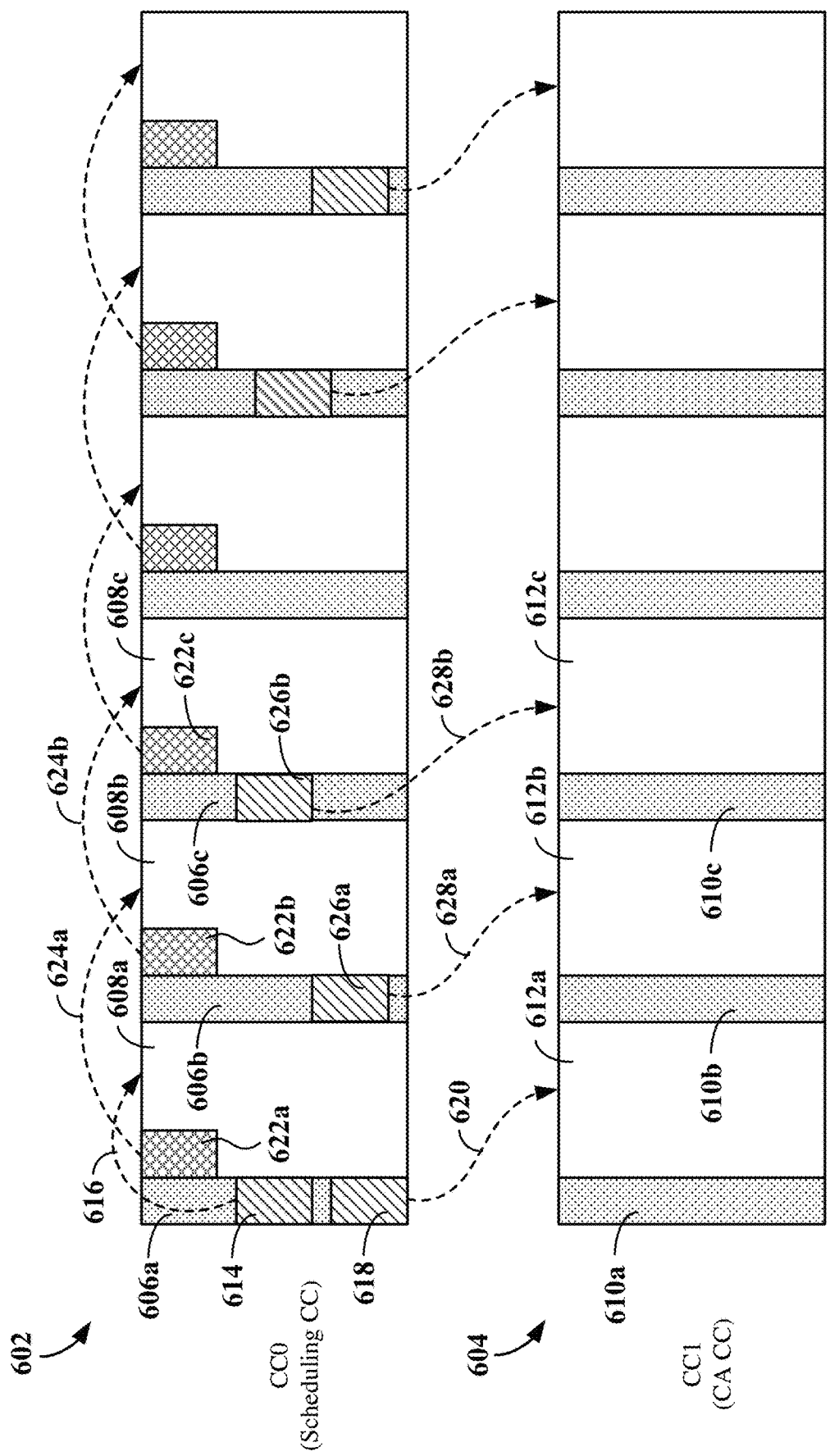
FIG. 6 is a diagram of an example of scheduling downlink control information (DCI) on a data channel according to some aspects.

In some examples, one CC may be scheduled by another CC. This scheme may be referred to as cross-carrier scheduling. FIG. 6 illustrates an example of cross-carrier scheduling in a carrier aggregation (CA) scenario including a first CC 602 (CC0) and a second CC 604 (CC1).

In the example of FIG. 6, control regions (e.g., PDCCHs) defined for the first CC 602 are indicated by the shaded vertical boxes (e.g., a first PDCCH 606a, a second PDCCH 606b, a third PDCCH 606c, and so on). In addition, data regions (e.g., PDSCHs) defined for the first CC 602 are indicated by the unshaded boxes (e.g., a first PDSCH 608a, a second PDSCH 608b, a third PDSCH 608c, and so on).

Similarly, control regions (e.g., PDCCHs) defined for the second CC 604 are indicated by the shaded vertical boxes (e.g., a first PDCCH 610a, a second PDCCH 610b, a third PDCCH 610c, and so on). In addition, data regions (e.g., PDSCHs) defined for the second CC 604 are indicated by the unshaded boxes (e.g., a first PDSCH 612a, a second PDSCH 612b, a third PDSCH 612c, and so on).

In some examples, the first CC 602 may be referred to as a scheduling carrier and the second CC 604 may be referred to as a scheduled CA carrier. For example, a control channel of the first CC 602 may carry scheduling information (e.g., a DCI) that schedules a PDSCH on the second CC 604, while the control channels of the second CC 604 do not carry scheduling information.

As one example, a base station may transmit a DCI 618 in the first PDCCH 606a of the first CC 602 to schedule a first PDSCH 612a of the second CC 604 (as represented by an arrow 620). Thus, the first CC 602 provides cross-carrier scheduling in this case.

In some examples, a base station may transmit at least one DCI in a PDSCH. Transmitting a DCI in a PDSCH may be referred to as piggy-backing the DCI in the PDSCH. In some examples, a DCI may be transmitted in the PDSCH in a situation where the PDCCH does not have adequate resources to carry multiple DCIs. This situation may arise, for example, when the size of a CORESET for PDCCH is relatively small and cannot accommodate multiple DCIs.

In some examples, a base station may transmit multiple DCIs that are an aggregation of multiple DL/UL grants. In this case, the delivery of these DL/UL grants in the PDSCH may be more efficient than transmitting the grants in a PDCCH, where a UE may need to perform blind decoding on the DCIs.

The disclosure relates in some aspects to transmitting DCIs on a data channel (e.g., PDSCH) in a carrier aggregation (CA) scenario. In some examples, this may involve cross-carrier scheduling (e.g., a DCI in a CC schedules a PDSCH in another CC) and, optionally, self-scheduling of a CC (e.g., a DCI in a CC schedules a PDSCH in that same CC).

In some examples, transmitting DCIs on a data channel may provide higher efficiency DCI delivery. For example, the DCIs may share the PDSCH beam, precoding, and DMRS. In some examples, transmitting DCIs on a data channel may provide higher efficiency PDSCH transmission. For example, rate matching might be applied only around the DCIs.

In the example of FIG. 6, a DCI 614 may schedule the first PDSCH 608a of the first CC 602 (as represented by an arrow 616). Thus, the DCI 614 provides intra-carrier scheduling (self-scheduling) while the DCI 618 discussed above provides cross-carrier scheduling.

In some examples, the first CC 602 may support the transmission of DCIs on a data channel while the second CC 604 does not. In this scenario, a DCI in a PDCCH of the first CC 602 may schedule a PDSCH on the first CC 602 and a PDSCH on the second CC 604. In addition, a DCI in a PDCCH of the first CC 602 may schedule DCIs on the PDSCH of the first CC 602. However, in this scenario, a DCI in a PDCCH of the first CC 602 that schedules a PDSCH on the second CC would not schedule DCIs on the PDSCH of the second CC 604 (e.g., piggy-back DCIs).

In some examples, a given DCI may indicate that multiple DCIs are present on multiple data channels on a particular CC. For example, the DCI 614 may include an indication of the number of DCIs (e.g., DCIs 622a, 622b, 622c, and so on) on the first CC 602. As another example, the DCI 614 may indicate that the first PDSCH 608a includes a first DCI 622a, that the second PDSCH 608b includes a second DCI 622b, that the third PDSCH 608c includes a third DCI 622c, and so on.

In some examples, a given DCI may indicate code rate information for the indicated DCIs. For example, the DCI may include at least one code rate offset factor ($\beta$).

In some examples, the DCI 614 may both schedule the first PDSCH 608a and indicate that the first PDSCH 608a includes a first DCI 622a. In addition, the first DCI 622a may schedule the second PDSCH 608b of the first CC 602 (as represented by a first arrow 624a). The first DCI 622a may indicate that the second PDSCH 608b includes a second DCI 622b. In addition, the second DCI 622b may schedule the third PDSCH 608c of the first CC 602 (as represented by a second arrow 624b). The second DCI 622b may indicate that the third PDSCH 608c includes a third DCI 622c. This so-called DCI piggy-backing may continue as indicated by the corresponding unlabeled arrows of the first CC 602.

FIG. 6 also illustrates other examples of cross-carrier scheduling. For example, a third DCI 626a in the second PDCCH 606b may schedule the second PDSCH 612b of the second CC 604 as indicated by an arrow 628a. In addition, a fourth DCI 626b in the third PDCCH 606c may schedule the third PDSCH 612c of the second CC 604 as indicated by an arrow 628b.

In some examples, a DCI format for a DL grant may be configured per BWP (per cell or per carrier). In scenarios where cross-carrier scheduling is allowed, support for transmission of multiple DCIs on a data channel may be configured per carrier (or per cell) in some examples.

In some examples that employ piggy-back DCIs (e.g., DCIs in a PDSCH) with cross-carrier scheduling, the piggy-back DCIs may have the same DCI format as the PDCCH region DCI. This configuration may apply to piggy-back DCIs on the scheduling carrier (e.g., CC0) and/or on the non-scheduling carrier (e.g., CC1).

For example, for a scenario where a first DCI (DCI0) in a first CC (CC0) schedules a second DCI (DCI_A) in a PDSCH of CC0, if the first DCI is DCI format 1_1, the same DCI format 1_1 is used for DCI_A and any other piggy-back DCIs in CC0. Similarly, if the first DCI is DCI format 0_1, the same DCI format 0_1 is used for DCI_A and any other any piggy-back DCIs in CC0.

As another example, for a scenario where a first DCI (DCI0) in a first CC (CC0) schedules a second DCI (DCI_B) in a PDSCH of a second CC (CC1), if the first DCI is DCI format 1_1, the same DCI format 1_1 is used for DCI_B and any other any piggy-back DCIs in CC1. Similarly, if the first DCI is DCI format 0_1, the same DCI format 0_1 is used for DCI_B and any other any piggy-back DCIs in CC1.

In some examples, the piggy-back DCIs may have the same length as the PDCCH region DCI. This configuration may apply to piggy-back DCIs on the scheduling carrier (e.g., CC0) and/or on the non-scheduling carrier (e.g., CC1).

For example, for a scenario where a first DCI (DCI0) in a first CC (CC0) schedules a second DCI (DCI_A) in a PDSCH of CC0, if the first DCI is DCI format 1_1, DCI_A and any other any piggy-back DCIs in CC0 may be aligned in size with DCI format 1_1. Similarly, if the first DCI is DCI format 0_1, DCI_A and any other any piggy-back DCIs in CC0 may be aligned in size with DCI format 0_1. In some examples, the size of the largest DCI may be used for all of these DCIs.

As another example, for a scenario where a first DCI (DCI0) in a first CC (CC0) schedules a second DCI (DCI_B) in a PDSCH of a second CC (CC1), if the first DCI is DCI format 1_1, DCI_B and any other any piggy-back DCIs in CC1 may be aligned in size with DCI format 1_1. Similarly, if the first DCI is DCI format 0_1, DCI_B and any other any piggy-back DCIs in CC1 may be aligned in size with DCI format 0_1. In some examples, the size of the largest DCI may be used for all of these DCIs.

In some examples, all cross-carrier indication functionality may be available (e.g., the applicable bit fields are available) in DCIs piggy-backed in PDSCH in either a scheduling CC (e.g., as shown in FIG. 6) or a scheduled CC (e.g., as discussed below). Several example CA scheduling schemes will now be described with reference to FIGS. 7-9.

The disclosure relates in some aspects to a first example where only the DCI in the PDCCH region of the scheduling carrier is allowed to do cross-carrier scheduling (e.g., a PDCCH DCI in CC0 can schedule a PDSCH in CC1), while the piggy-back DCI in the PDSCH of the non-scheduling carrier only does self-scheduling (e.g., a piggy-back DCI in CC1 only schedules a PDSCH in CC1). In some examples, the DCIs piggy-backed in different CCs can be of different sizes if the sizes are known. This allows the CA CC to self-schedule (e.g., in piggy-backed DCIs only). Here, PDCCH may be monitored across carriers (e.g., across cells).

Figure 7:
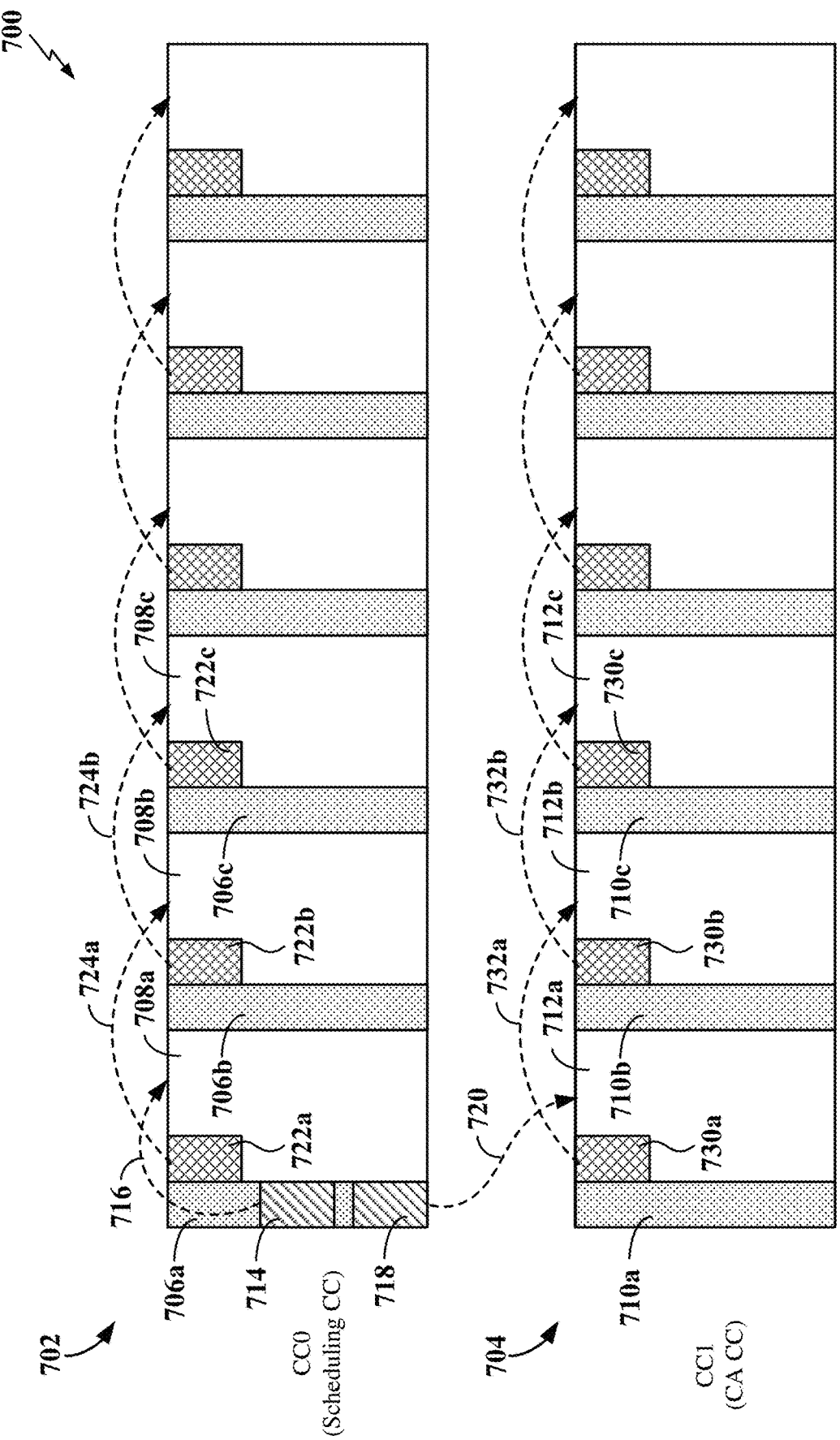
FIG. 7 is a diagram of an example of cross-carrier scheduling of multiple DCIs on a data channel according to some aspects.

FIG. 7 illustrates the first example in a CA scheme that includes a first CC 702 (CC0) and a second CC 704 (CC1). In some examples, the first CC 702 may be referred to as a scheduling carrier (e.g., a control channel of the first CC 702 may carry scheduling information such as a DCI). In some examples, the second CC 704 may be referred to as a scheduled CA carrier (e.g., a control channel of the second CC 704 does not carry scheduling information).

The first CC 702 includes control regions (e.g., PDCCHs) as indicated by the shaded vertical boxes (e.g., a first PDCCH 706a, a second PDCCH 706b, a third PDCCH 706c, and so on). The first CC 702 also includes data regions (e.g., PDSCHs) as indicated by the unshaded boxes (e.g., a first PDSCH 708a, a second PDSCH 708b, a third PDSCH 708c, and so on).

Similarly, the second CC 704 includes control regions (e.g., PDCCHs) as indicated by the shaded vertical boxes (e.g., a first PDCCH 710a, a second PDCCH 710b, a third PDCCH 710c, and so on). The second CC 704 also includes data regions (e.g., PDSCHs) as indicated by the unshaded boxes (e.g., a first PDSCH 712a, a second PDSCH 712b, a third PDSCH 712c, and so on).

In the example of FIG. 7, a DCI 714 may schedule the first PDSCH 708a of the first CC 702 (as represented by an arrow 716). In addition, a DCI 718 may schedule the first PDSCH 712a of the second CC 704 (as represented by an arrow 720). Thus, the DCI 714 provides intra-carrier scheduling (self-scheduling) while the DCI 718 provides cross-carrier scheduling.

In some examples, a given DCI may indicate that multiple DCIs are present on multiple data channels. For example, the DCI 714 may include an indication of the number of DCIs (e.g., DCIs 722a, 722b, 722c, and so on) on the first CC 702. As another example, the DCI 714 may indicate that the first PDSCH 708a includes a first DCI 722a, that the second PDSCH 708b includes a second DCI 722b, that the third PDSCH 708c includes a third DCI 722c, and so on.

In some examples, a given DCI may indicate code rate information for the indicated DCIs. For example, the DCI 714 may include at least one code rate offset factor ($\beta$).

The DCI 714 may both schedule the first PDSCH 708a and indicate that the first PDSCH 708a includes a first DCI 722a. In addition, the first DCI 722a may schedule the second PDSCH 708b of the first CC 702 (as represented by a first arrow 724a). The first DCI 722a may indicate that the second PDSCH 708b includes a second DCI 722b. In addition, the second DCI 722b may schedule the third PDSCH 708c of the first CC 702 (as represented by a second arrow 724b). The second DCI 722b may indicate that the third PDSCH 708c includes a third DCI 722c. This DCI piggy-backing may continue as indicated by the unlabeled arrows of the first CC 702.

In the example of FIG. 7, multiple DCIS are also scheduled on the data channel of the second CC 704. Here, the DCI 718 may schedule the first PDSCH 712a and indicate that the first PDSCH 712a of the second CC 704 includes a first DCI 730a. In addition, the first DCI 730a may schedule the second PDSCH 712b (as represented by a first arrow 732a). The first DCI 730a may indicate that the second PDSCH 712b includes a second DCI 730b. In addition, the second DCI 730b may schedule the third PDSCH 712c of the second CC 704 (as represented by a second arrow 732b). The second DCI 730b may indicate that the third PDSCH 712c includes a third DCI 730c. This DCI piggy-backing may continue as indicated by the corresponding unlabeled arrows of the second CC 704.

The disclosure relates in some aspects to a second example where a DCI piggy-backed in the PDSCH of the scheduling carrier may do cross-carrier (or cross-cell) scheduling. That is, as compared to the first example of FIG. 7, the second example further allows cross-carrier scheduling by a DCI piggy-backed in the scheduled carrier (e.g., CC1). This second example can be used with or independent of the example of FIG. 7 discussed above. For example, CC1 can be scheduled by the CC0 PDCCH region and the piggy-back region, but CC1 might not be allowed to self-schedule.

In some scenarios, this second example may be limited to the case where the sizes of the DCIs in CC0 that schedule different CCs are matched in size. For example, the DCIs may originally be the same size, or zero padding may be used to match the sizes of the DCIs. Alternatively, if the sizes of the DCIs do not match, the UE may be configured to attempt decoding with different DCI sizes (with or without DCI length information).

Figure 8:
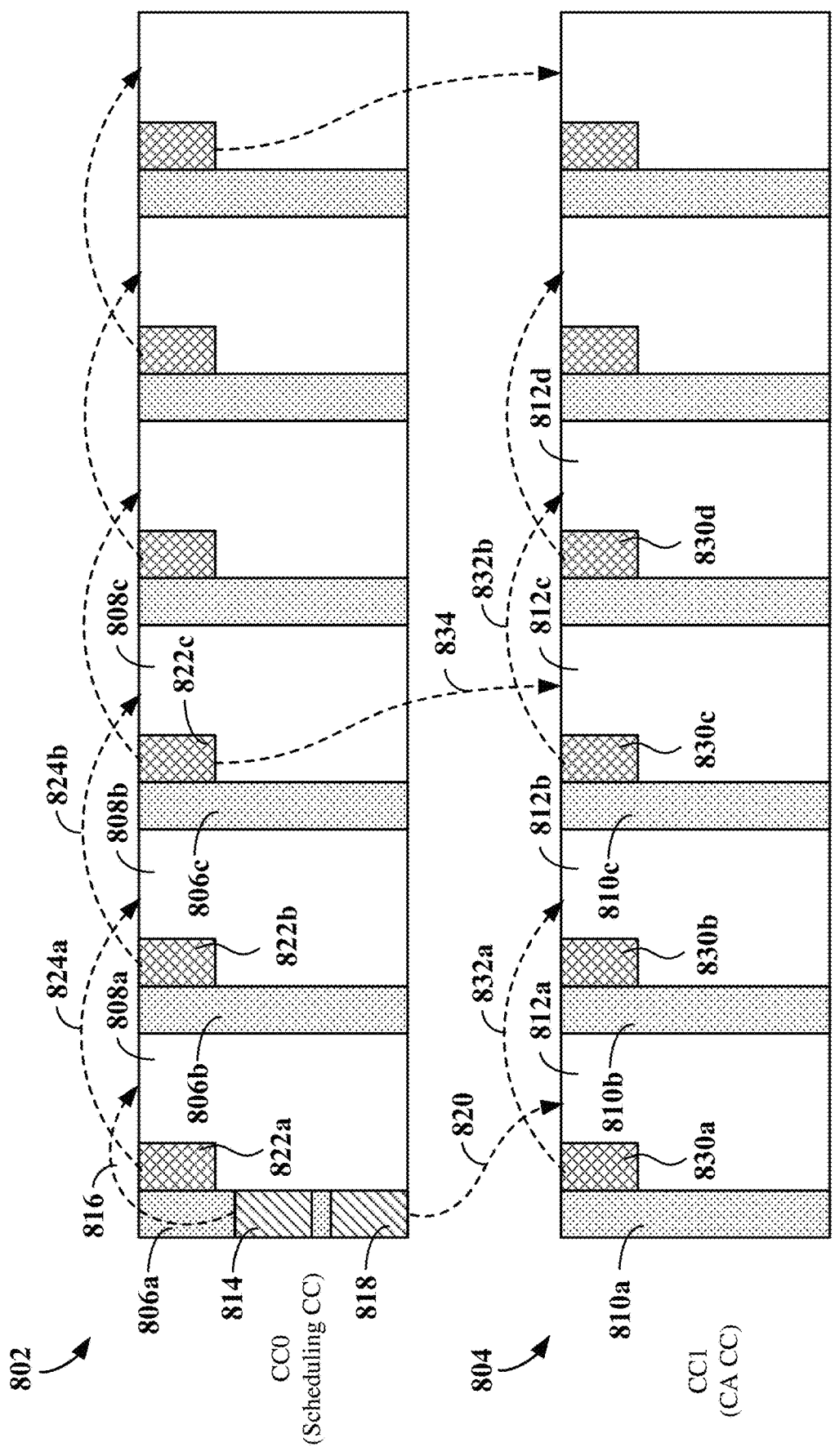
FIG. 8 is a diagram of another example cross-carrier scheduling of multiple DCIs on a data channel according to some aspects.

FIG. 8 illustrates the second example in a CA scenario that include a first CC 802 (CC0) and a second CC 802 (CC1). In some examples, the first CC 802 may be referred to as a scheduling carrier (e.g., a control channel of the first CC 802 may carry scheduling information such as a DCI). In some examples, the second CC 802 may be referred to as a scheduled CA carrier (e.g., a control channel of the second CC 804 does not carry scheduling information).

The first CC 802 includes control regions (e.g., PDCCHs) as indicated by the shaded vertical boxes (e.g., a first PDCCH 806a, a second PDCCH 806b, a third PDCCH 806c, and so on). The first CC 802 also includes data regions (e.g., PDSCHs) as indicated by the unshaded boxes (e.g., a first PDSCH 808a, a second PDSCH 808b, a third PDSCH 808c, and so on).

Similarly, the second CC 804 includes control regions (e.g., PDCCHs) as indicated by the shaded vertical boxes (e.g., a first PDCCH 810a, a second PDCCH 810b, a third PDCCH 810c, and so on). The second CC 804 also includes data regions (e.g., PDSCHs) as indicated by the unshaded boxes (e.g., a first PDSCH 812a, a second PDSCH 812b, a third PDSCH 812c, and so on).

In the example of FIG. 8, a DCI 814 may schedule the first PDSCH 808a of the first CC 802 (as represented by an arrow 816). In addition, a DCI 818 may schedule the first PDSCH 812a of the second CC 804 (as represented by an arrow 820). Thus, the DCI 814 provides intra-carrier scheduling (self-scheduling) while the DCI 818 provides cross-carrier scheduling.

In some examples, a given DCI may indicate that multiple DCIs are present on multiple data channels. For example, the DCI 814 may include an indication of the number of DCIs (e.g., DCIs 822a, 822b, 822c, and so on) on the first CC 802. As another example, the DCI 814 may indicate that the first PDSCH 808a includes a first DCI 822a, that the second PDSCH 808b includes a second DCI 822b, that the third PDSCH 808c includes a third DCI 822c, and so on.

In some examples, a given DCI may indicate code rate information for the indicated DCIs. For example, the DCI 814 may include at least one code rate offset factor ($\beta$).

The DCI 814 may schedule the first PDSCH 808a and indicate that the first PDSCH 808a includes a first DCI 822a. In addition, the first DCI 822a may schedule the second PDSCH 808b of the first CC 802 (as represented by a first arrow 824a). The first DCI 822a may indicate that the second PDSCH 808b includes a second DCI 822b. In addition, the second DCI 822b may schedule the third PDSCH 808c of the first CC 802 (as represented by a second arrow 824b). The second DCI 822b may indicate that the third PDSCH 808c includes a third DCI 822c. This DCI piggy-backing may continue as indicated by the corresponding unlabeled arrows of the first CC 802.

The DCI 818 may both schedule the first PDSCH 812a and indicate that the first PDSCH 812a of the second CC 804 includes a first DCI 830a. In addition, the first DCI 830a may schedule the second PDSCH 812b (as represented by a first arrow 832a). The first DCI 830a may indicate that the second PDSCH 812b includes a second DCI 830b. In addition, a third DCI 830c may schedule a fourth PDSCH 812d of the second CC 804 (as represented by a second arrow 832b). The third DCI 830c may indicate that the fourth PDSCH 812d includes a fourth DCI 830d. This DCI piggy-backing may continue as indicated by the unlabeled arrows of the second CC 804.

In the example of FIG. 8, DCIs in the data regions of the first CC 802 may schedule the second CC 804. For example, the third DCI 822c may schedule the third PDSCH 812c of the second CC 804 (as represented by an arrow 834). The third DCI 822c may indicate that the third PDSCH 812c includes a third DCI 830c. Another example of cross-carrier scheduling is indicated by the unlabeled sixth slot of FIG. 8.

The disclosure relates in some aspects to a third example where a DCI piggy-backed in the PDSCH of either carrier can do cross-carrier scheduling. In this option, all piggy-back regions may be considered as extended control resources for the CC0 control region.

In some scenarios, this third example may be limited to the case where the sizes of the DCIs that schedule different CCs are matched in size. For example, the DCIs may originally be the same size, or zero padding may be used to match the sizes of the DCIs. Alternatively, if the sizes of the DCIs do not match, the UE may be configured to attempt decoding with different DCI sizes (with or without DCI length information).

Figure 9:
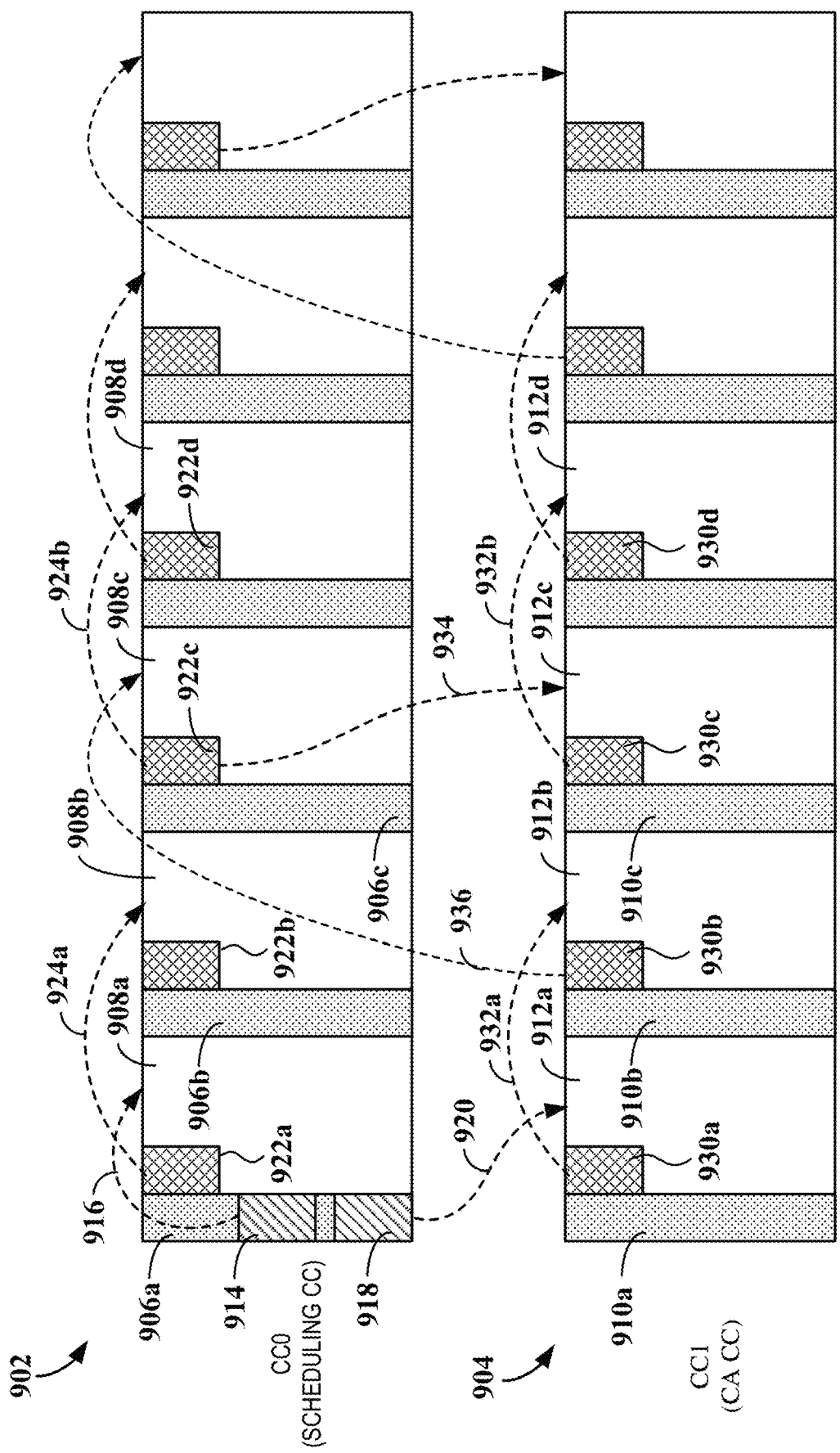
FIG. 9 is a diagram of another example cross-carrier scheduling of multiple DCIs on a data channel according to some aspects.

FIG. 9 illustrates the third example in a CA scenario including a first CC 902 (CC0) and a second CC 904 (CC1). In some examples, the first CC 902 may be referred to as a scheduling carrier (e.g., a control channel of the first CC 902 may carry scheduling information such as a DCI). In some examples, the second CC 904 may be referred to as a scheduled CA carrier (e.g., a control channel of the second CC 904 does not carry scheduling information).

The first CC 902 includes control regions (e.g., PDCCHs) as indicated by the shaded vertical boxes (e.g., a first PDCCH 906a, a second PDCCH 906b, a third PDCCH 906c, and so on). The first CC 902 also includes data regions (e.g., PDSCHs) as indicated by the unshaded boxes (e.g., a first PDSCH 908a, a second PDSCH 908b, a third PDSCH 908c, and so on).

Similarly, the second CC 904 includes control regions (e.g., PDCCHs) as indicated by the shaded vertical boxes (e.g., a first PDCCH 910a, a second PDCCH 910b, a third PDCCH 910c, and so on). The second CC 904 also includes data regions (e.g., PDSCHs) as indicated by the unshaded boxes (e.g., a first PDSCH 912a, a second PDSCH 912b, a third PDSCH 912c, and so on).

In the example of FIG. 9, a DCI 914 may schedule the first PDSCH 908a of the first CC 902 (as represented by an arrow 916). In addition, a DCI 918 may schedule the first PDSCH 912a of the second CC 904 (as represented by an arrow 920). Thus, the DCI 914 provides intra-carrier scheduling (self-scheduling) while the DCI 918 provides cross-carrier scheduling.

In some examples, a given DCI may indicate that multiple DCIs are present on multiple data channels. For example, the DCI 914 may include an indication of the number of DCIs (e.g., DCIs 922a, 922b, 922c, and so on) on the first CC 902. As another example, the DCI 914 may indicate that the first PDSCH 908a includes a first DCI 922a, that the second PDSCH 908b includes a second DCI 922b, that the third PDSCH 908c includes a third DCI 922c, and so on.

In some examples, a given DCI may indicate code rate information for the indicated DCIs. For example, the DCI 914 may include at least one code rate offset factor ($\beta$).

The DCI 914 may both schedule the first PDSCH 908a and indicate that the first PDSCH 908a includes a first DCI 922a. In addition, the first DCI 922a may schedule the second PDSCH 908b of the first CC 902 (as represented by a first arrow 924a). The first DCI 922a may indicate that the second PDSCH 908b includes a second DCI 922b. In addition, the third DCI 922c may schedule the fourth PDSCH 908d of the first CC 902 (as represented by a second arrow 924b). The third DCI 922c may indicate that the fourth PDSCH 908d includes a fourth DCI 922d.

The DCI 918 may schedule the first PDSCH 912a and indicate that the first PDSCH 912a of the second CC 904 includes a first DCI 930a. In addition, the first DCI 930a may schedule the second PDSCH 912b (as represented by a first arrow 932a). The first DCI 930a may indicate that the second PDSCH 912b includes a second DCI 930b. In addition, a third DCI 930c may schedule a fourth PDSCH 912d of the second CC 904 (as represented by a second arrow 932b). The third DCI 930c may indicate that the fourth PDSCH 912d includes a fourth DCI 930d. This DCI piggy-backing may continue as indicated by the unlabeled arrows of the second CC 904.

In the example of FIG. 9, DCIs in the data regions of the first CC 902 may schedule the second CC 904 and DCIs in the data regions of the second CC 904 may schedule the first CC 902. That is, piggy-backed DCIs of each CC may perform cross-carrier scheduling.

For example, the third DCI 922c may schedule the third PDSCH 912c of the second CC 904. The third DCI 922c may indicate that the third PDSCH 912c includes a third DCI 930c (as represented by an arrow 934). Another example of this cross-carrier scheduling is indicated by the unlabeled sixth slot of FIG. 9.

In addition, the second DCI 930b of the second CC 904 may schedule the third PDSCH 908c of the first CC 902 (as represented by an arrow 936). The second DCI 930b may indicate that the third PDSCH 908c includes a third DCI 922c. Another example of this cross-carrier scheduling is indicated by the unlabeled fifth slot of FIG. 9.

From FIGS. 7-9, it may be seen that in some examples a CA system may include two CCs where CC0 is a scheduling carrier (or cell) and CC1 is scheduled carrier (or cell). Here, a CC0 control region may carry DCIs to schedule CC0 and CC1. For each CC, a UE may monitor for a DCI (a first DCI for CC0 and second DCI for CC1). In addition, the first and second DCI may be in a control region or embedded in a PDSCH (embedded in a piggy-back region).

In some examples, CC1 can be scheduled by a DCI in a control region of CC0 and/or by a DCI in a piggy-back region in CC1. In this case, CC0 may be scheduled by a DCI in a control region of CC0 and/or by a DCI in piggy-back region in CC0.

In some examples, CC1 may be scheduled by a DCI in a control region of CC0 and/or by a DCI in a piggy-back region in CC1 and/or by a DCI in a piggy-back region in CC0. In this case, CC0 may be scheduled by a DCI in a control region of CC0 and/or by a DCI in piggy-back region in CC0.

In some examples, CC0 may be scheduled by a DCI in a control region of CC0 and/or by a DCI in a piggy-back region in CC0 and/or by a DCI in a piggy-back region in CC1. In this case, CC1 may be scheduled by a DCI in a control region of CC0 and/or by a DCI in a piggy-back region in CC1 and/or by a DCI in a piggy-back region in CC0.

Figure 10:
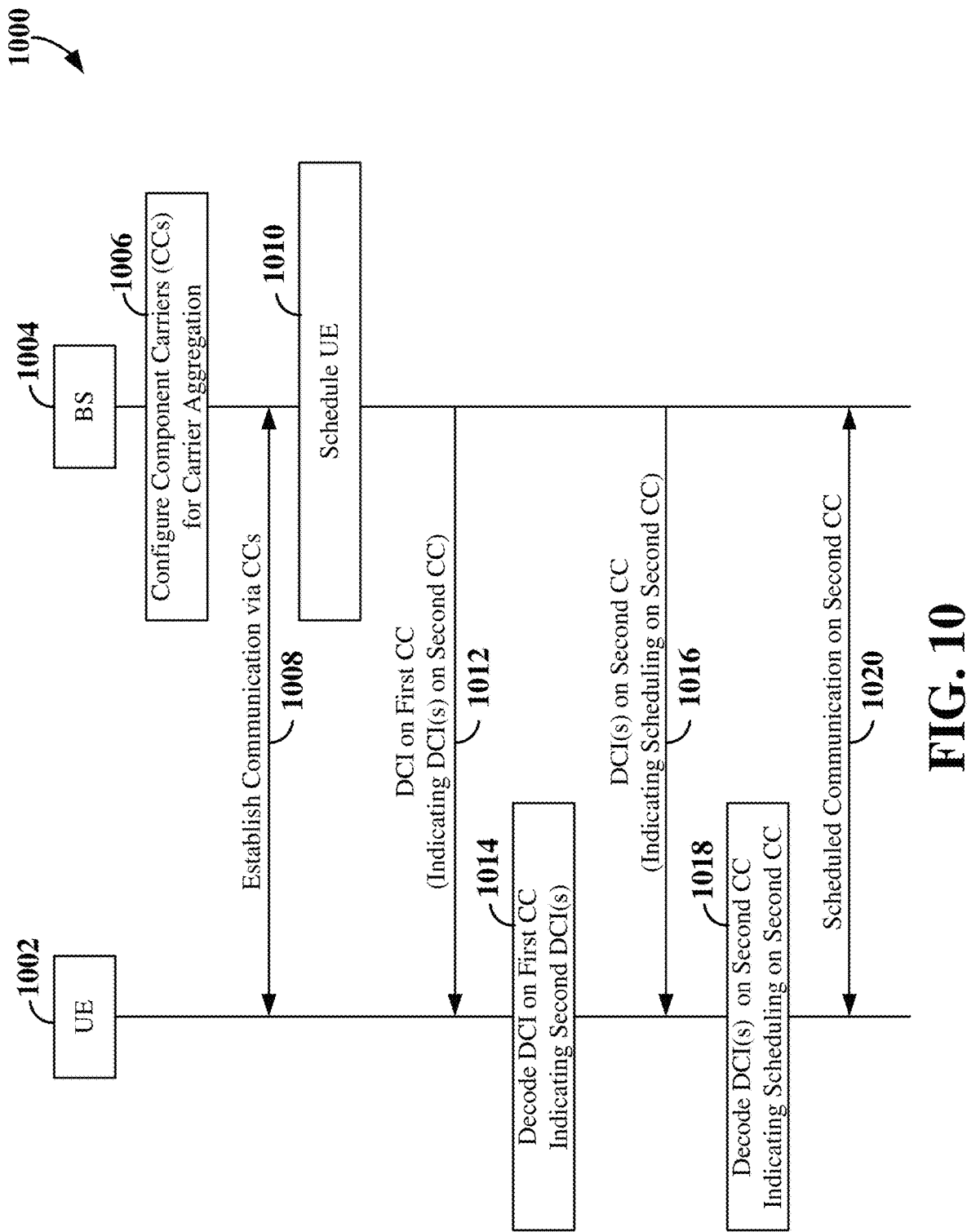
FIG. 10 is a signaling diagram illustrating cross-carrier scheduling of multiple DCIs on a data channel according to some aspects.

FIG. 10 is a diagram illustrating an example of signaling 1000 for scheduling a communication in a wireless communication network including a UE 1002 and a BS 1004. In some examples, the UE 1002 may correspond to any of the UEs or scheduled entities shown in any of FIGS. 1, 2, 5, and 11. In some examples, the BS 1004 may correspond to any of the base stations or scheduling entities shown in any of FIGS. 1, 2, 5, and 16.

At 1006 of FIG. 10, the BS 1004 configures two or more component carriers (CCs) for a carrier aggregation scheme. For example, the BS 1004 may establish the CCs to enable the UE 1002 to use multiple carriers for communication with the BS 1004.

At 1008, the BS 1004 and the UE 1002 establish communication via the CCs (e.g., a first CC and a second CC). In some examples, the first CC may be a scheduling CC and the second CC may be a scheduled CC.

At 1010, the BS 1004 schedules communication (e.g., at least one downlink communication and/or at least one an uplink communication) for the UE 1002 on a data channel of the second CC. For example, the BS 1004 may schedule at least one downlink communication and/or at least one an uplink communication for the UE 1002.

At 1012, the BS 1004 sends a DCI to the UE 1002 on the first CC. This DCI indicates that the BS 1004 will send at least one DCI on the second CC (e.g., on a data channel of the second CC). For example, the DCI may indicate that the BS 1004 will send at least one DCI on a data channel of the second CC.

As discussed herein, the DCI may be sent via a control channel of the first CC or a data channel of the first CC. In the latter case, the BS 1004 may have sent a prior DCI to the UE 1002 on the control channel of the first CC to inform the UE 1002 that a DCI is being sent on the data channel.

At 1014, the UE 1002 decodes the DCI sent on the first CC. Thus, the UE 1002 determines that the BS 1004 will send at least one DCI on the second CC.

At 1016, the BS 1004 sends at least one DCI on the second CC (e.g., on a data channel of the second CC). For example, the BS 1004 may send at least one DCI on a data channel of the second CC. The at least one DCI may include scheduling information for the UE 1002. For example, the at least one DCI may include at least one uplink grant for the UE 1002 and/or at least one downlink grant for the UE 1002.

At 1018, the UE 1002 decodes the DCI(s) sent on the second CC. Thus, the UE 1002 may determine that the BS 1004 has scheduled at least one resource on the second CC for the UE 1002. For example, the UE may decode at least one uplink grant that indicates that the UE 1002 is scheduled to transmit on certain resources of the data channel of the second CC. As another example, the UE may decode at least one downlink grant that indicates that the UE 1002 is scheduled to receive on certain resources of the data channel of the second CC.

At 1020, the UE 1002 and the BS 1004 may communicate according to the scheduled communication. For example, if the DCI(s) on the second CC scheduled an UL transmission for the UE 1002, the UE 1002 may transmit information to the BS 1004 via the designated resource(s). As another example, if the DCI(s) on the second CC scheduled a DL reception for the UE 1002, the UE 1002 may receive information from the BS 1004 via the designated resource(s).

Figure 11:
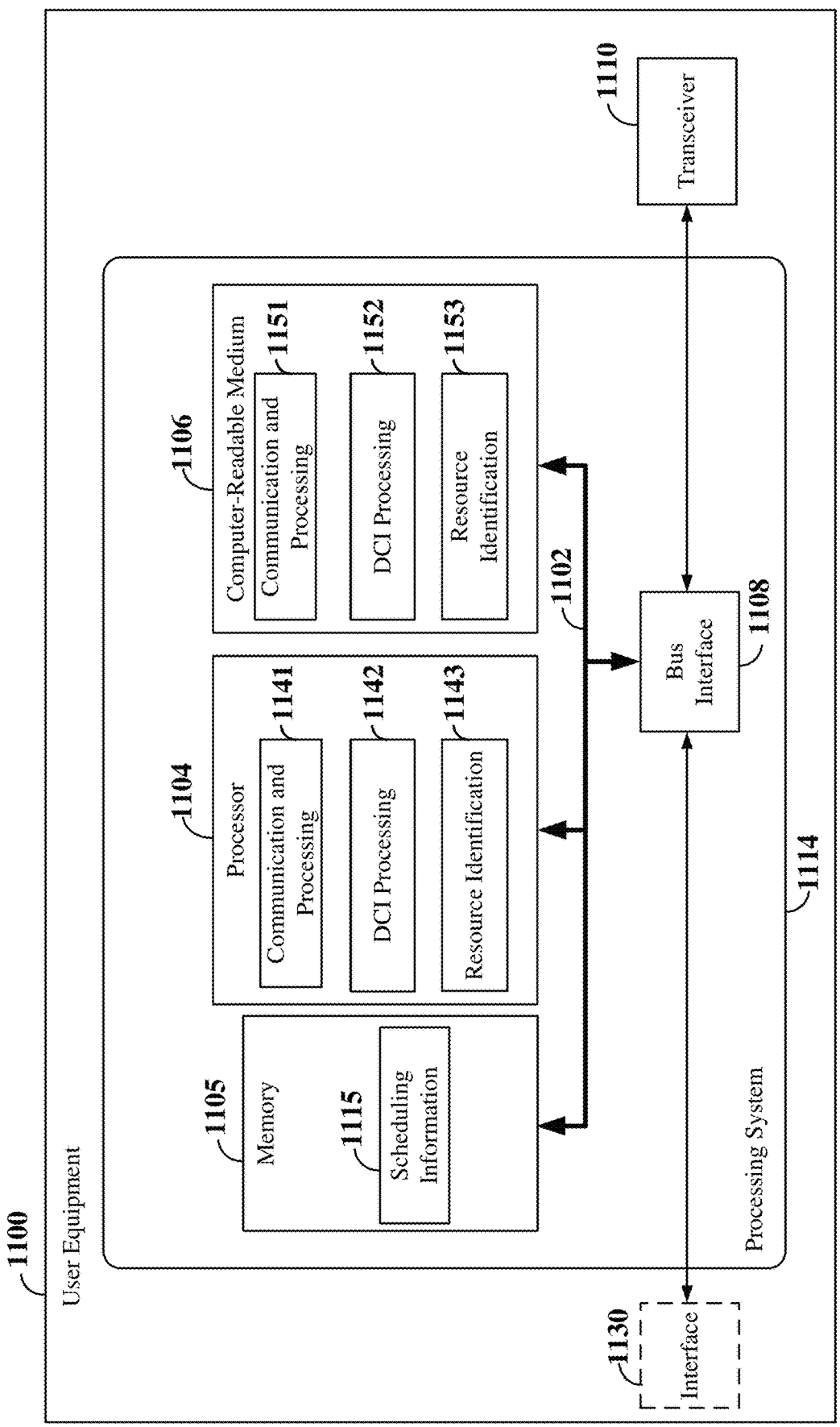
FIG. 11 is a block diagram conceptually illustrating an example of a hardware implementation for a user equipment employing a processing system according to some aspects.

FIG. 11 is a block diagram illustrating an example of a hardware implementation for a UE 1100 employing a processing system 1114. For example, the UE 1100 may be a device configured to wirelessly communicate with a base station, as discussed in any one or more of FIGS. 1-10. In some implementations, the UE 1100 may correspond to any of the UEs or scheduled entities shown in any of FIGS. 1, 2, 5, and 10.

In accordance with various aspects of the disclosure, an element, or any portion of an element, or any combination of elements may be implemented with the processing system 1114. The processing system 1114 may include one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described herein.

The processor 1104 may in some instances be implemented via a baseband or modem chip and in other implementations, the processor 1104 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110 and between the bus 1102 and an interface 1130. The transceiver 1110 provides a communication interface or means for communicating with various other apparatus over a wireless transmission medium. The interface 1130 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1130 may include a user interface (e.g., keypad, display, speaker, microphone, joystick). Of course, such a user interface is optional, and may be omitted in some examples, such as an IoT device.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store scheduling information 1115 used by the processor 1104 for the scheduling-related operations described herein.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1100 may be configured to perform any one or more of the operations described herein (e.g., as described above in conjunction with FIGS. 1-10 and as described below in conjunction with FIGS. 12-15). In some aspects of the disclosure, the processor 1104, as utilized in the UE 1100, may include circuitry configured for various functions.

The processor 1104 may include communication and processing circuitry 1141. The communication and processing circuitry 1141 may be configured to communicate with a base station, such as a gNB. The communication and processing circuitry 1141 may include one or more hardware components that provide the physical structure that performs various processes related to wireless communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. In some examples, the communication and processing circuitry 1141 may include two or more transmit/receive chains. The communication and processing circuitry 1141 may further be configured to execute communication and processing software 1151 included on the computer-readable medium 1106 to implement one or more functions described herein.

In some implementations where the communication involves receiving information, the communication and processing circuitry 1141 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may include functionality for a means for receiving. In some examples, the communication and processing circuitry 1141 may include functionality for a means for decoding.

In some implementations where the communication involves sending (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., a means for transmitting). In some examples, the communication and processing circuitry 1141 may include functionality for a means for encoding.

In some examples, the communication and processing circuitry 1141 may include functionality for a means for communicating information. For example, the communication and processing circuitry 1141 may transmit data to a gNB via an uplink resource (e.g., PUSCH) scheduled by a DCI received by the UE 1100. As another example, the communication and processing circuitry 1141 may receive data from a gNB via a downlink resource (e.g., PDSCH) scheduled by a DCI received by the UE 1100.

The processor 1104 may include DCI processing circuitry 1142 configured to perform DCI processing-related operations as discussed herein (e.g., in conjunction with FIGS. 6-10). In some examples, the DCI processing circuitry 1142 may be configured to execute DCI processing software 1152 included on the computer-readable medium 1106 to implement one or more functions described herein.

In some examples, the DCI processing circuitry 1142 may include functionality for a means for receiving a DCI (e.g., first DCI) on a first RF carrier. For example, the DCI processing circuitry 1142 may monitor a control channel (e.g., a PDCCH) scheduled by a gNB on a first RF carrier and attempt to decode any DCIs transmitted on the control channel. In addition, upon determining that a first DCI indicates that the gNB is also transmitting a second DCI on a data channel (e.g., a PDSCH of the first RF carrier and/or at least one second RF carrier), the DCI processing circuitry 1142 may monitor the data channel (e.g., PDSCH) scheduled by the gNB and attempt to decode any DCIs transmitted on the data channel.

In some examples, the DCI processing circuitry 1142 may include functionality for a means for receiving a DCI (e.g., a first DCI or a second DCI) on a data channel (e.g., a PDSCH) of a second RF carrier. For example, the DCI processing circuitry 1142 may monitor a PDSCH on the second RF carrier scheduled by the gNB (e.g., scheduled by a DCI received on a control channel or a data channel of the first RF carrier or received on a data channel of the second RF carrier) and attempt to decode any DCIs transmitted on the PDSCH.

In some examples, the DCI processing circuitry 1142 may include functionality for a means for receiving a second DCI on a first RF carrier. For example, the DCI processing circuitry 1142 may monitor a control channel (e.g., a PDCCH) scheduled by a gNB on a first RF carrier and attempt to decode any DCIs transmitted on the control channel that schedule a data channel on at least one second RF carrier. In addition, upon determining that the DCI indicates that the gNB is also transmitting a DCI on a PDSCH (e.g., of a second RF carrier), the DCI processing circuitry 1142 may monitor the PDSCH scheduled by the gNB and attempt to decode any DCIs transmitted on the PDSCH.

The processor 1104 may include resource identification circuitry 1143 configured to perform resource identification-related operations as discussed herein (e.g., in conjunction with FIGS. 6-10). In some examples, the resource identification circuitry 1143 may be configured to execute resource identification software 1153 included on the computer-readable medium 1106 to implement one or more functions described herein.

In some examples, the resource identification circuitry 1143 may include functionality for a means for identifying a resource (e.g., at least one time and frequency resource). For example, the DCI processing circuitry 1142 may parse a first DCI received by the DCI processing circuitry 1142 to identify at least one resource (e.g., a PDSCH or a PUSCH) scheduled by the first DCI. In some examples, if the first DCI schedules a second DCI on a data channel (e.g., on a PDSCH), the DCI processing circuitry 1142 may parse the second DCI received by the DCI processing circuitry 1142 on the data channel to identify at least one resource associated with the data channel (e.g., a PDSCH or a PUSCH) scheduled by the second DCI. In some examples, if a first DCI received on a first RF carrier schedules a data channel (e.g., a PDSCH or a PUSCH) on a second RF carrier, the DCI processing circuitry 1142 may parse the first DCI to identify at least one resource associated with the data channel (e.g., a PDSCH or a PUSCH) scheduled by the second DCI.

In some examples, the resource identification circuitry 1143 may include functionality for a means for using a DCI to identify a scheduled resource (e.g., at least one time and frequency resource) on a data channel. For example, if a DCI received on a control channel (e.g., PDCCH) or a data channel (e.g., PDSCH) of a first RF carrier schedules a data channel (e.g., a PDSCH or a PUSCH) on the first RF carrier, the DCI processing circuitry 1142 may parse the DCI to identify at least one resource associated with the data channel (e.g., a PDSCH or a PUSCH) scheduled by the DCI. As another example, if a DCI received on a control channel (e.g., PDCCH) or a data channel (e.g., PDSCH) of a first RF carrier schedules a data channel (e.g., a PDSCH or a PUSCH) on a second RF carrier, the DCI processing circuitry 1142 may parse the DCI to identify at least one resource associated with the data channel (e.g., a PDSCH or a PUSCH) scheduled by the DCI. As a further example, if a DCI received on a data channel (e.g., PDSCH) of a second RF carrier schedules a data channel (e.g., a PDSCH or a PUSCH) on a first RF carrier, the DCI processing circuitry 1142 may parse the DCI to identify at least one resource associated with the data channel (e.g., a PDSCH or a PUSCH) scheduled by the DCI.

Figure 12:
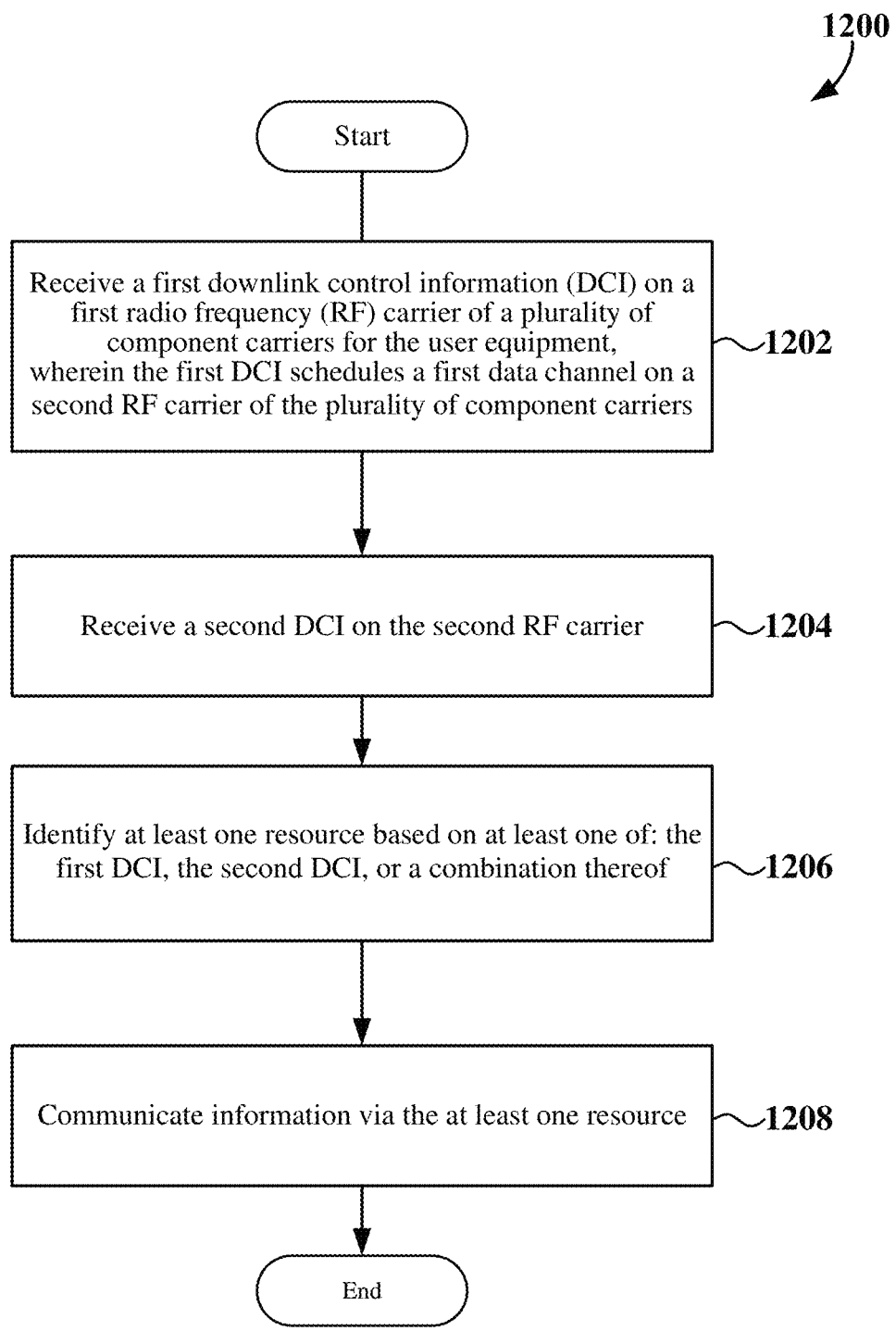
FIG. 12 is a flow chart illustrating an example wireless communication method involving cross-carrier scheduling and DCIs on data channels of multiple carriers according to some aspects.

In some examples, the DCI processing circuitry 1142, the resource identification circuitry 1143, the communication and processing circuitry 1141, and the transceiver 1110 may cooperate to provide a first wireless communication method (e.g., the method 1200 of FIG. 12). In some examples, the DCI processing circuitry 1142 in cooperation with the communication and processing circuitry 1141 and the transceiver 1110 may be configured to monitor a resource (e.g., PDCCH) scheduled by a base station to receive a first DCI from the base station via a first component carrier. In some examples, the DCI processing circuitry 1142 in cooperation with the communication and processing circuitry 1141 and the transceiver 1110 may be configured to monitor a resource (e.g., PDSCH) indicated by the first DCI to receive a second DCI from a base station via a second component carrier. In some examples, the resource identification circuitry 1143 may be configured to parse a first DCI and a second DCI to determine whether a resource allocation is indicated (e.g., directly or indirectly) by the first DCI and/or the second DCI. In some examples, the communication and processing circuitry 1141 and the transceiver 1110 may be configured to transmit data to a base station via a scheduled uplink resource (e.g., a PUSCH) and/or receive data from a base station via a scheduled downlink resource (e.g., a PUSCH).

Figure 13:
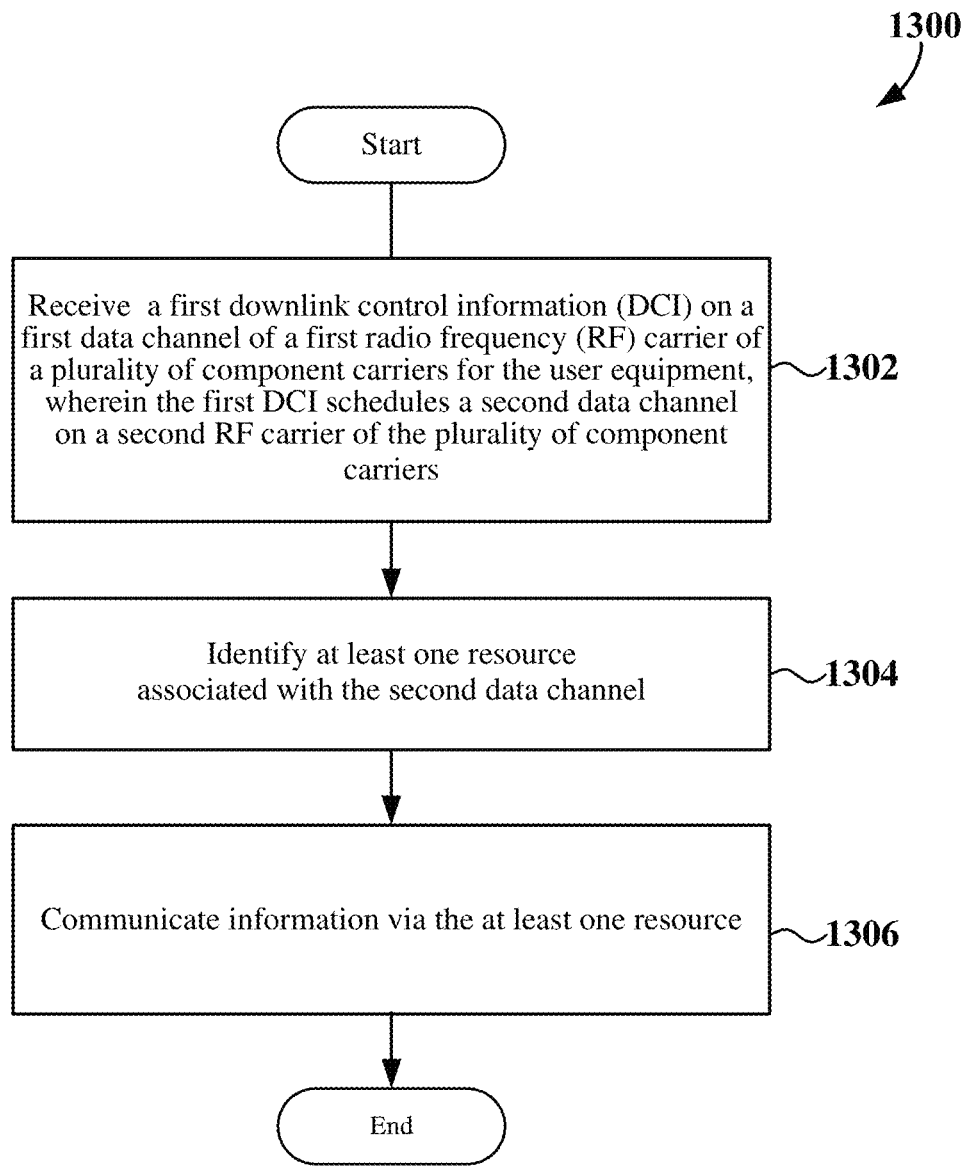
FIG. 13 is a flow chart illustrating an example wireless communication method involving cross-carrier scheduling by a DCI on a data channel according to some aspects.

In some examples, the DCI processing circuitry 1142, the resource identification circuitry 1143, the communication and processing circuitry 1141, and the transceiver 1110 may cooperate to provide a second wireless communication method (e.g., the method 1300 of FIG. 13). In some examples, the DCI processing circuitry 1142 in cooperation with the communication and processing circuitry 1141 and the transceiver 1110 may be configured to monitor a resource (e.g., PDCCH) scheduled by a base station to receive a first DCI from a base station via a first component carrier. In some examples, the resource identification circuitry 1143 may be configured to parse the first DCI (and, optionally, a second DCI indicated by the first DCI) to determine whether a scheduled resource (e.g., a resource allocation) is indicated (e.g., directly or indirectly) by the first DCI. In some examples, the communication and processing circuitry 1141 and the transceiver 1110 may be configured to transmit data to a base station via a scheduled uplink resource (e.g., a PUSCH) and/or receive data from a base station via a scheduled downlink resource (e.g., a PUSCH).

Figure 14:
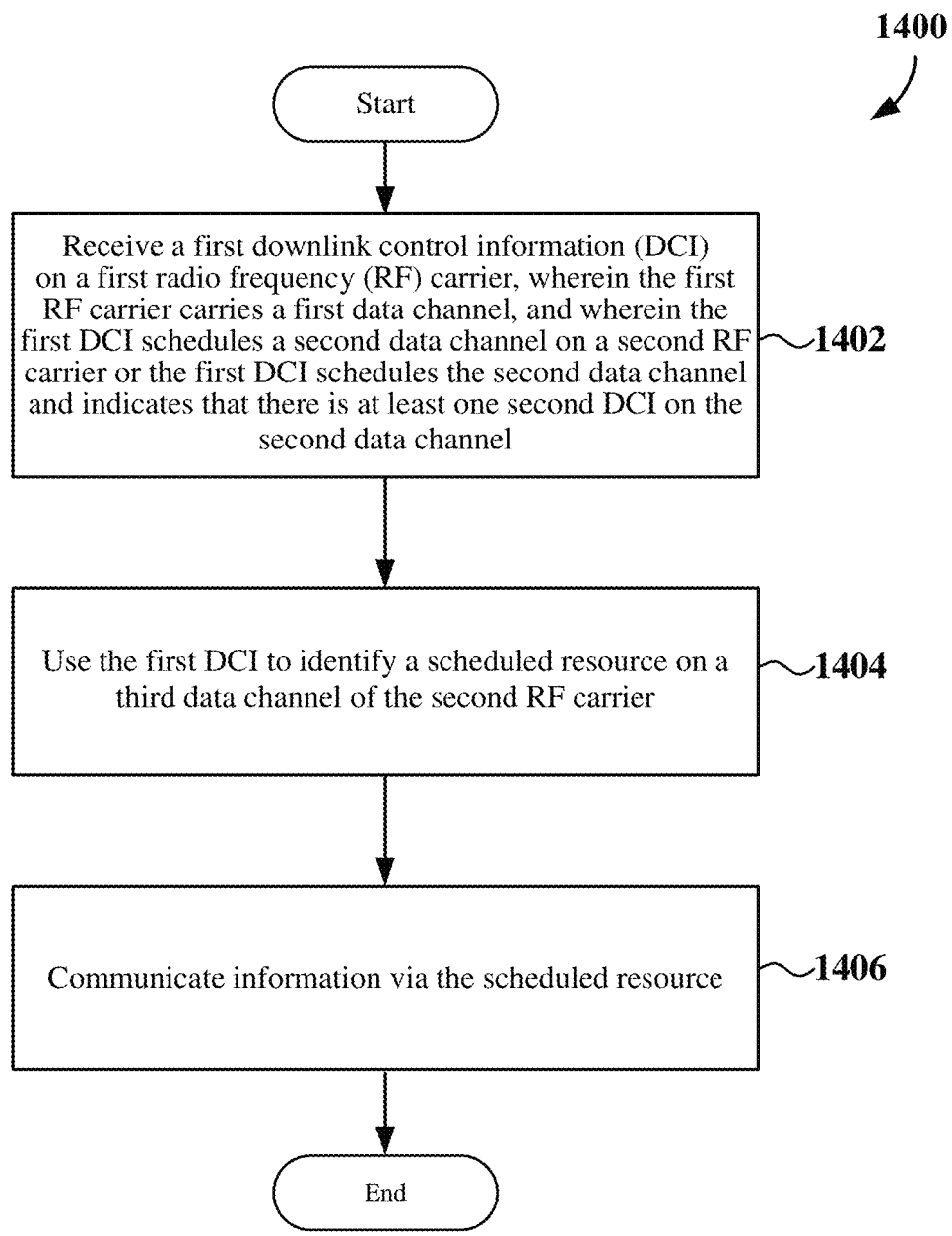
FIG. 14 is a flow chart illustrating an example wireless communication method for cross-carrier scheduling of multiple DCIs on a data channel according to some aspects.

In some examples, the DCI processing circuitry 1142, the resource identification circuitry 1143, the communication and processing circuitry 1141, and the transceiver 1110 may cooperate to provide a third wireless communication method (e.g., the method 1400 of FIG. 14). In some examples, the DCI processing circuitry 1142 in cooperation with the communication and processing circuitry 1141 and the transceiver 1110 may be configured to receive a first DCI from a base station. In some examples, the resource identification circuitry 1143 may be configured to identify a resource indicated (e.g., directly or indirectly) by the first DCI. In some examples, the communication and processing circuitry 1141 and the transceiver 1110 may be configured to send information to and/or receive information from a base station via the resource.

Figure 15:
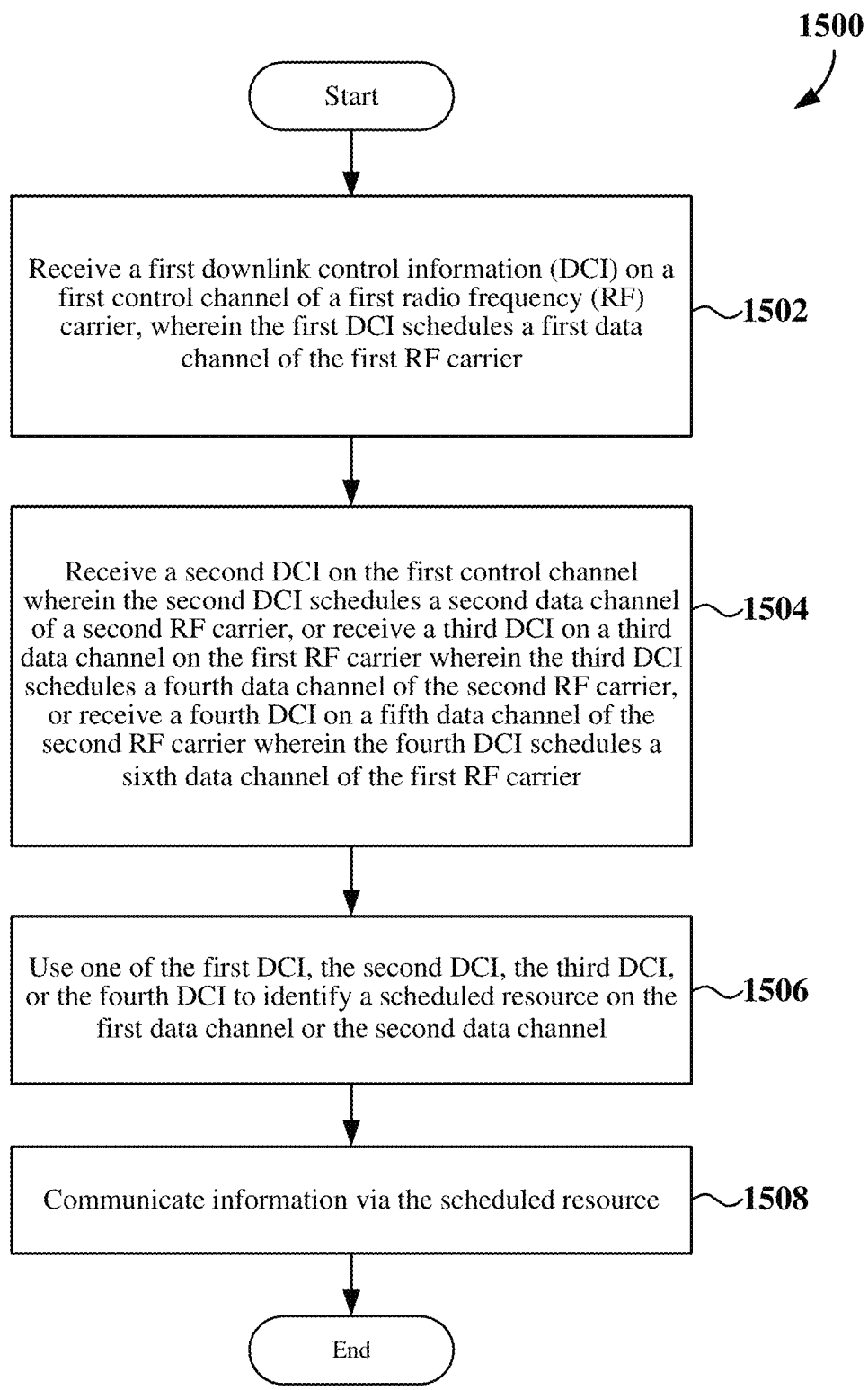
FIG. 15 is a flow chart illustrating another example wireless communication method for cross-carrier scheduling of multiple DCIs on a data channel according to some aspects.

In some examples, the DCI processing circuitry 1142, the resource identification circuitry 1143, the communication and processing circuitry 1141, and the transceiver 1110 may cooperate to provide a fourth wireless communication method (e.g., the method 1500 of FIG. 15). In some examples, the DCI processing circuitry 1142 in cooperation with the communication and processing circuitry 1141 and the transceiver 1110 may be configured to receive a first DCI from a base station. In some examples, the DCI processing circuitry 1142 in cooperation with the communication and processing circuitry 1141 and the transceiver 1110 may be configured to receive a second DCI from the base station. In some examples, the resource identification circuitry 1143 may be configured to identify a resource indicated (e.g., directly or indirectly) by any of these DCIs. In some examples, the communication and processing circuitry 1141 and the transceiver 1110 may be configured to send information to and/or receive information from a base station via the resource.

FIG. 12 is a flow chart illustrating an example method 1200 for a user equipment in accordance with some aspects of the present disclosure. As described below, some or all illustrated features may be omitted in a particular implementation within the scope of the present disclosure, and some illustrated features may not be required for implementation of all examples. In some examples, the method 1200 may be carried out by the user equipment 1100 illustrated in FIG. 11. In some examples, the method 1200 may be carried out by any suitable apparatus or means for carrying out the functions or algorithm described below.

At block 1202, a user equipment (UE) may receive a first downlink control information (DCI) on a first radio frequency (RF) carrier of a plurality of component carriers for the user equipment. In some examples, the first DCI schedules a first data channel on a second RF carrier of the plurality of component carriers. In some examples, the DCI processing circuitry 1142 in cooperation with the communication and processing circuitry 1141 and the transceiver 1110, shown and described above in connection with FIG. 11, may provide a means to receive a first DCI on a first RF carrier.

In some examples, the UE may receive the first DCI on a first control channel (e.g., PDCCH 706A of FIG. 7) on the first RF carrier (e.g., CC0 DCI is a control channel DCI). In some examples, the UE may receive the first DCI on a second data channel (e.g., PDSCH 708A of FIG. 7) on the first RF carrier (e.g., CC0 DCI is a piggy-back DCI).

At block 1204, the UE may receive a second DCI on the second RF carrier. In some examples, the DCI processing circuitry 1142 in cooperation with the communication and processing circuitry 1141 and the transceiver 1110, shown and described above in connection with FIG. 11, may provide a means to receive a second DCI on the second RF carrier.

The first DCI and/or the second DCI may carry different information in different examples. In some examples, the first DCI indicates that the second DCI is on a second data channel (e.g., PDSCH 712A of FIG. 7) on the second RF carrier (e.g., CC0 DCI identifies CC1 DCI). In some examples, the second DCI schedules a second data channel (e.g., PDSCH 712B of FIG. 7) on the second RF carrier (e.g., CC1 DCI schedules CC1 PDSCH). In some examples, the second DCI schedules a second data channel on the first RF carrier (e.g., CC1 DCI schedules CC0 PDSCH). In some examples, the second DCI indicates that a third DCI (e.g., DCI 730B of FIG. 7) is carried by the second RF carrier (e.g., CC1 DCI identifies CC1 piggy-back DCI).

The first DCI and the second DCI may have similar formats in some examples. In some examples, the first DCI is based on a first DCI format and the second DCI is based on the first DCI format. In some examples, the first DCI has a first length and the second DCI has the first length.

The first DCI may include one or more indications in different examples. In some examples, the first DCI may include an indication of how many DCIs are carried by the second RF carrier. In some examples, the first DCI may include an indication of at least one code rate offset factor for the second DCI.

At block 1206, the UE may identify at least one resource based on at least one of the first DCI, the second DCI, or a combination thereof. In some examples, the resource identification circuitry 1143, shown and described above in connection with FIG. 11, may provide a means to identify at least one resource based on at least one of the first DCI, the second DCI, or a combination thereof.

At block 1208, the UE may communicate information via the at least one resource. In some examples, the communication and processing circuitry 1141 and the transceiver 1110, shown and described above in connection with FIG. 11, may provide a means to communicate information via the at least one resource.

In some examples, the UE receives a third DCI on the first RF carrier. In some examples, a third DCI (e.g., DCI 714 of FIG. 7) on the first RF carrier schedules a second data channel (e.g., PDSCH 708A of FIG. 7) on the first RF carrier (e.g., CC0 DCI schedules PDSCH on CC0). In some examples, a third DCI (e.g., DCI 714 of FIG. 7) on the first RF carrier indicates that a fourth DCI (e.g., DCI 722A of FIG. 7) is carried by a second data channel (e.g., PDSCH 708A of FIG. 7) on the first RF carrier (e.g., CC0 DCI identifies CC0 piggy-back DCI).

The first RF carrier may be a scheduling CC and the second RF carrier may be a scheduled CC, or vice versa. In some examples, the first RF carrier (e.g., CC0) is a scheduling component carrier of the plurality of component carriers. In some examples, the second RF carrier (e.g., CC1) is a scheduled component carrier of the plurality of component carriers.

The RF carriers may be millimeter wave (mmW) carriers in some examples. For example, the first RF carrier may be a first mmW carrier and the second RF carrier may be a second mmW carrier.

FIG. 13 is a flow chart illustrating an example method 1300 for a user equipment in accordance with some aspects of the present disclosure. As described below, some or all illustrated features may be omitted in a particular implementation within the scope of the present disclosure, and some illustrated features may not be required for implementation of all examples. In some examples, the method 1300 may be carried out by the user equipment 1100 illustrated in FIG. 11. In some examples, the method 1300 may be carried out by any suitable apparatus or means for carrying out the functions or algorithm described below.

At block 1302, a user equipment (UE) may receive a first downlink control information (DCI) on a first data channel of a first radio frequency (RF) carrier of a plurality of component carriers for the user equipment, wherein the first DCI schedules a second data channel on a second RF carrier of the plurality of component carriers. In some examples, the DCI processing circuitry 1142 in cooperation with the communication and processing circuitry 1141 and the transceiver 1110, shown and described above in connection with FIG. 11, may provide a means to receive a first DCI on a first data channel of a first RF carrier.

The first RF carrier may be a scheduling CC and the second RF carrier may be a scheduled CC, or vice versa. In some examples, the first RF carrier is a scheduling component carrier of the plurality of component carriers and the second RF carrier is a scheduled component carrier of the plurality of component carriers. In some examples, the first RF carrier is a scheduled component carrier of the plurality of component carriers and the second RF carrier is a scheduling component carrier of the plurality of component carriers.

The first DCI may carry different information in different examples. In some examples, the first DCI schedules a third data channel on the first RF carrier. For example, a piggy-back DCI may schedule a PDSCH on the first RF carrier.

At block 1304, the UE may identify at least one resource associated with the second data channel. In some examples, the resource identification circuitry 1143, shown and described above in connection with FIG. 11, may provide a means to identify at least one resource associated with the second data channel.

At block 1306, the UE may communicate information via the at least one resource. In some examples, the communication and processing circuitry 1141 and the transceiver 1110, shown and described above in connection with FIG. 11, may provide a means to communicate information via the at least one resource.

In some examples, the UE may receive a second DCI on a first control channel of the first RF carrier, where the second DCI schedules a third data channel on the second RF carrier (e.g., CC0 PDCCH DCI also does cross-carrier scheduling). In some examples, the UE may receive a second DCI on a first control channel of the first RF carrier, where the second DCI schedules a third data channel on the first RF carrier (e.g., CC0 PDCCH DCI schedules PDSCH on CC0). In some examples, the UE may receive a second DCI on a first control channel of the first RF carrier, where the second DCI indicates that a third DCI is carried by a third data channel on the first RF carrier (e.g., CC0 PDCCH DCI identifies CC0 piggy-back DCI).

In some examples, the UE may receive a second DCI on the second RF carrier. In some examples, the first DCI indicates that the second DCI is carried by the second data channel on the second RF carrier (e.g., CC0 piggy-back DCI identifies CC1 DCI). In some examples, the UE may receive a third DCI on a first control channel of the first RF carrier, where the third DCI indicates that the second DCI is carried by a third data channel on the second RF carrier (e.g., CC0 PDCCH DCI identifies CC1 DCI). In some examples, the second DCI schedules a third data channel on the second RF carrier (e.g., CC1 DCI schedules CC1 PDSCH). In some examples, the second DCI indicates that a third DCI is carried by a third data channel of the second RF carrier (e.g., CC1 DCI identifies CC1 piggy-back DCI). In some examples, the second DCI schedules a third data channel on the first RF carrier (e.g., CC1 DCI schedules CC0 PDSCH).

The first DCI and the second DCI may have similar formats in some examples. In some examples, the first DCI is based on a first DCI format and the second DCI is based on the first DCI format. In some examples, the first DCI has a first length and the second DCI has the first length.

The first DCI may include one or more indications in different examples. In some examples, the first DCI may include an indication of how many DCIs are carried by the second RF carrier. In some examples, the first DCI may include an indication of at least one code rate offset factor for the second DCI.

FIG. 14 is a flow chart illustrating an example method 1400 for a user equipment in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the user equipment 1100 illustrated in FIG. 11. In some examples, the method 1400 may be carried out by any suitable apparatus or means for carrying out the functions or algorithm described below.

At block 1402, a user equipment (UE) may receive a first downlink control information (DCI) on a first radio frequency (RF) carrier. In some examples, the first RF carrier may carry (e.g., transport or otherwise include) a first data channel. The first DCI may schedule a second data channel on a second RF carrier or the first DCI may schedule the second data channel and indicate that there is at least one second DCI on the second data channel. In some examples, the DCI processing circuitry 1142 in cooperation with the communication and processing circuitry 1141 and the transceiver 1110, shown and described above in connection with FIG. 11, may provide a means to receive a first DCI on a first RF carrier.

The first DCI may include one or more indications in different examples. In some examples, the first DCI may include an indication of how many DCIs are carried by the second RF carrier. In some examples, the first DCI may include an indication of at least one code rate offset factor for the at least one second DCI.

The first DCI and the at least one second DCI may have similar formats in some examples. In some examples, the first DCI may be based on a first DCI format and the at least one second DCI may be based on the first DCI format. In some examples, the first DCI may have a first length and the at least one second DCI may have the first length.

The RF carriers may be millimeter wave (mmW) carriers in some examples. For example, the first RF carrier may be a first mmW carrier and the second RF carrier may be a second mmW carrier.

In some examples, the UE may receive the first DCI on a first control channel of the first RF carrier. In some examples, the first RF carrier may be a scheduling component carrier of a plurality of component carriers configured for the user equipment and the second RF carrier may be a scheduled component carrier of the plurality of component carriers.

In some examples, the UE may receive the first DCI on the first data channel of the first RF carrier. In some examples, the first RF carrier may be a scheduling component carrier of a plurality of component carriers configured for the user equipment and the second RF carrier may be a scheduled component carrier of the plurality of component carriers.

At block 1404, the UE may use the first DCI to identify a scheduled resource on a third data channel of the second RF carrier. In some examples, the resource identification circuitry 1143, shown and described above in connection with FIG. 11, may provide a means to identify a scheduled resource on a third data channel of the second RF carrier.

In some examples, to identify the scheduled resource, the UE may use the first DCI to identify the at least one second DCI on the second data channel and use the at least one second DCI to identify the scheduled resource.

At block 1406, the user equipment may communicate information via the scheduled resource. In some examples, the communication and processing circuitry 1141 and the transceiver 1110, shown and described above in connection with FIG. 11, may provide a means to communicate information via the scheduled resource.

In some examples, the UE may receive a third DCI on a first control channel of the second RF carrier, where the third DCI may indicate that at least one fourth DCI is on the first data channel of the first RF carrier. In some examples, the second RF carrier may be a scheduling component carrier of a plurality of component carriers configured for the user equipment and the first RF carrier may be a scheduled component carrier of the plurality of component carriers. In some examples, the UE may receive the first DCI on the first data channel of the first RF carrier. In some examples, the at least one fourth DCI may include the first DCI.

The third DCI and the at least one fourth DCI may have similar formats in some examples. In some examples, the third DCI may be based on a first DCI format and the at least one fourth DCI may be based on the first DCI format. In some examples, the third DCI may have a first length and the at least one fourth DCI may have the first length.

FIG. 15 is a flow chart illustrating an example method 1500 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the user equipment 1100 illustrated in FIG. 11. In some examples, the method 1500 may be carried out by any suitable apparatus or means for carrying out the functions or algorithm described below.

At block 1502, a user equipment (UE) may receive a first downlink control information (DCI) on a first control channel of a first radio frequency (RF) carrier, wherein the first DCI schedules a first data channel of the first RF carrier. In some examples, the DCI processing circuitry 1142 in cooperation with the communication and processing circuitry 1141 and the transceiver 1110, shown and described above in connection with FIG. 11, may provide a means to receive a first DCI on a first control channel of a first RF carrier.

At block 1504, the UE may receive a second DCI on the first control channel wherein the second DCI schedules a second data channel of a second RF carrier, or receive a third DCI on a third data channel on the first RF carrier wherein the third DCI schedules a fourth data channel of the second RF carrier, or receive a fourth DCI on a fifth data channel of the second RF carrier wherein the fourth DCI schedules a sixth data channel of the first RF carrier. In some examples, the DCI processing circuitry 1142 in cooperation with the communication and processing circuitry 1141 and the transceiver 1110, shown and described above in connection with FIG. 11, may provide a means to receive a second DCI on the first control channel. In some examples, the DCI processing circuitry 1142 in cooperation with the communication and processing circuitry 1141 and the transceiver 1110 may provide a means to receive a third DCI on a third data channel on the first RF carrier. In some examples, the DCI processing circuitry 1142 in cooperation with the communication and processing circuitry 1141 and the transceiver 1110, shown and described above in connection with FIG. 11, may provide a means to receive a fourth DCI on a fifth data channel of the second RF carrier.

The first DCI may include one or more indications in different examples. In some examples, the first DCI may include an indication of how many DCIs are carried by the second RF carrier. In some examples, the first DCI may include an indication of at least one code rate offset factor for the at least one second DCI.

The first DCI and the at least one second DCI may have similar formats in some examples. In some examples, the first DCI may be based on a first DCI format and the at least one second DCI may be based on the first DCI format. In some examples, the first DCI may have a first length and the at least one second DCI may have the first length.

The RF carriers may be millimeter wave (mmW) carriers in some examples. For example, the first RF carrier may be a first mmW carrier and the second RF carrier may be a second mmW carrier.

At block 1506, the user equipment may use one of the first DCI, the second DCI, the third DCI, or the fourth DCI to identify a scheduled resource on the first data channel or the second data channel. In some examples, the resource identification circuitry 1143, shown and described above in connection with FIG. 11, may provide a means to use one of the first DCI, the second DCI, the third DCI, or the fourth DCI to identify a scheduled resource on the first data channel or the second data channel.

At block 1508, the user equipment may communicate information via the scheduled resource. In some examples, the communication and processing circuitry 1141 and the transceiver 1110, shown and described above in connection with FIG. 11, may provide a means to communicate information via the scheduled resource.

In some examples, the first RF carrier may be a scheduling component carrier of a plurality of component carriers configured for the user equipment and the second RF carrier may be a scheduled component carrier of the plurality of component carriers.

In some examples, the third DCI may be in a control region of the first RF carrier and schedules a resource on the first data channel. In some examples, the third DCI may be in the first data channel of the first RF carrier and schedules a resource on the first data channel.

In some examples, the third DCI may be in a control region of the first RF carrier and schedules a resource on the second data channel. In some examples, the fourth DCI may be in the second data channel of the second RF carrier and schedules a resource on the second data channel.

In some examples, the third DCI may be in the first data channel of the first RF carrier and schedules a resource on the second data channel. In some examples, the fourth DCI may be in the second data channel of the second RF carrier and schedules a resource on the first data channel.

In one configuration, the user equipment 1100 includes means for receiving a first downlink control information (DCI) on a first radio frequency (RF) carrier of a plurality of component carriers for the user equipment, wherein the first DCI schedules a first data channel on a second RF carrier of the plurality of component carriers, means for receiving a second DCI on the second RF carrier, means for identifying at least one resource based on at least one of: the first DCI, the second DCI, or a combination thereof, and means for communicating information via the at least one resource. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one or more of FIGS. 1, 2, 5, and 10, and utilizing, for example, the processes and/or algorithms described herein in relation to FIGS. 12-15.

Figure 16:
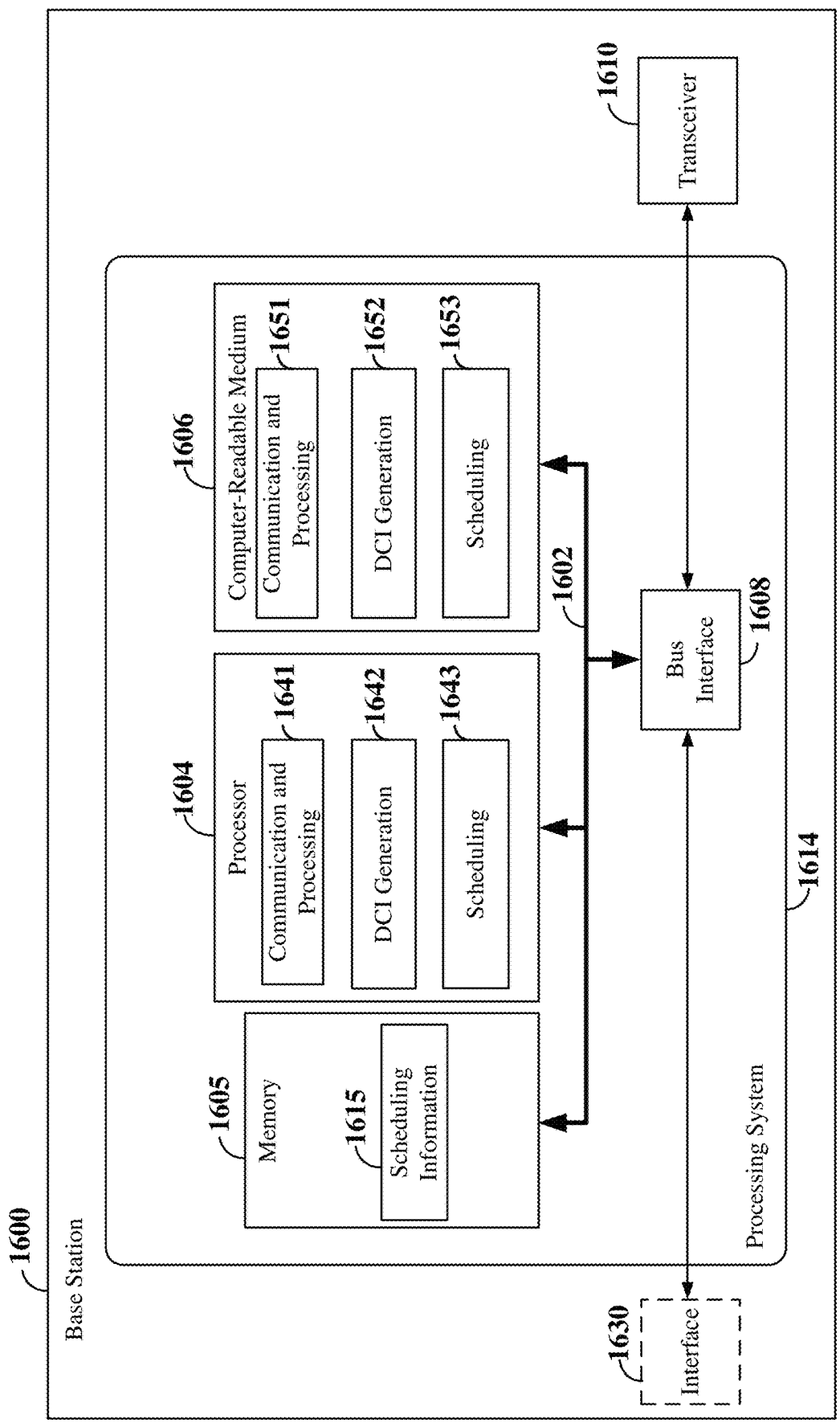
FIG. 16 is a block diagram conceptually illustrating an example of a hardware implementation for a base station employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs) or scheduling entities shown in any of FIGS. 1, 2, 5, and 10.

In accordance with various aspects of the disclosure, an element, or any portion of an element, or any combination of elements may be implemented with the processing system 1614. The processing system may include one or more processors 1604. The processing system 1614 may be substantially the same as the processing system 1014 illustrated in FIG. 10, including a bus interface 1608, a bus 1602, memory 1605, a processor 1604, and a computer-readable medium 1606. The memory 1605 may store scheduling information 1615 (e.g., for cross-carrier scheduling and piggy-back DCIs) used by the processor 1604 in cooperation with the transceiver 1610 for scheduling operations. Furthermore, the BS 1600 may include an interface 1630 (e.g., a network interface) that provides a means for communicating with at least one other apparatus within a core network and with at least one radio access network.

The BS 1600 may be configured to perform any one or more of the operations described herein (e.g., as described above in conjunction with FIGS. 1-10 and as described below in conjunction with FIG. 17). In some aspects of the disclosure, the processor 1604, as utilized in the BS 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs. The processor 1604 may be configured to schedule resources for the transmission of downlink signals (e.g., SSBs). The processor 1604 may further be configured to schedule resources for the transmission of uplink signals.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

The communication and processing circuitry 1641 may further be configured to transmit a message to the UE. For example, the message be included in a MAC-CE carried in a PUSCH, DCI in a PUCCH or PUSCH, a random access message, or an RRC message.

In some implementations wherein the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

In some examples, the communication and processing circuitry 1641 may include functionality for a means for communicating information. For example, the communication and processing circuitry 1641 may transmit data to a UE via a downlink resource (e.g., PDSCH) scheduled by a DCI sent to the UE. As another example, the communication and processing circuitry 1641 may receive data from a UE via an uplink resource (e.g., PUSCH) scheduled by a DCI sent to the UE.

The processor 1604 may include DCI generation circuitry 1642 configured to perform DCI generation-related operations as discussed herein (e.g., in conjunction with FIGS. 6-10). In some examples, the DCI generation circuitry 1642 may be configured to execute DCI generation software 1652 included on the computer-readable medium 1606 to implement one or more functions described herein.

In some examples, the DCI generation circuitry 1642 may include functionality for a means for generating a DCI. For example, if a schedule generated by the scheduling circuitry 1643 indicates cross-carrier scheduling, the DCI generation circuitry 1642 may generate a DCI for transmission on a first carrier, where the DCI schedules a second carrier. As another example, if a schedule generated by the scheduling circuitry 1643 indicates DCI piggy-backing, the DCI generation circuitry 1642 may generate a DCI that indicates that a data channel will carry a DCI.

In some examples, the DCI generation circuitry 1642 may include functionality for a means for transmitting a DCI. For example, the DCI generation circuitry 1642 may transmit a DCI to a UE via a PDCCH or a PDSCH allocated by the scheduling circuitry 1643 for the UE.

The processor 1604 may include scheduling circuitry 1643 configured to perform scheduling-related operations as discussed herein (e.g., in conjunction with FIGS. 6-10). In some examples, the scheduling circuitry 1643 may further be configured to execute scheduling software 1653 included on the computer-readable medium 1606 to implement one or more functions described herein.

In some examples, the scheduling circuitry 1643 may include functionality for a means for scheduling a resource. For example, the scheduling circuitry 1643 may determine whether to perform cross-carrier scheduling (e.g., to supplement data transmissions on a primary carrier). As another example, the scheduling circuitry 1643 may determine whether to perform DCI piggy-backing (e.g., in a scenario where the PDCCH is not large enough to accommodate all of the grants to be sent to a UE).

Figure 17:
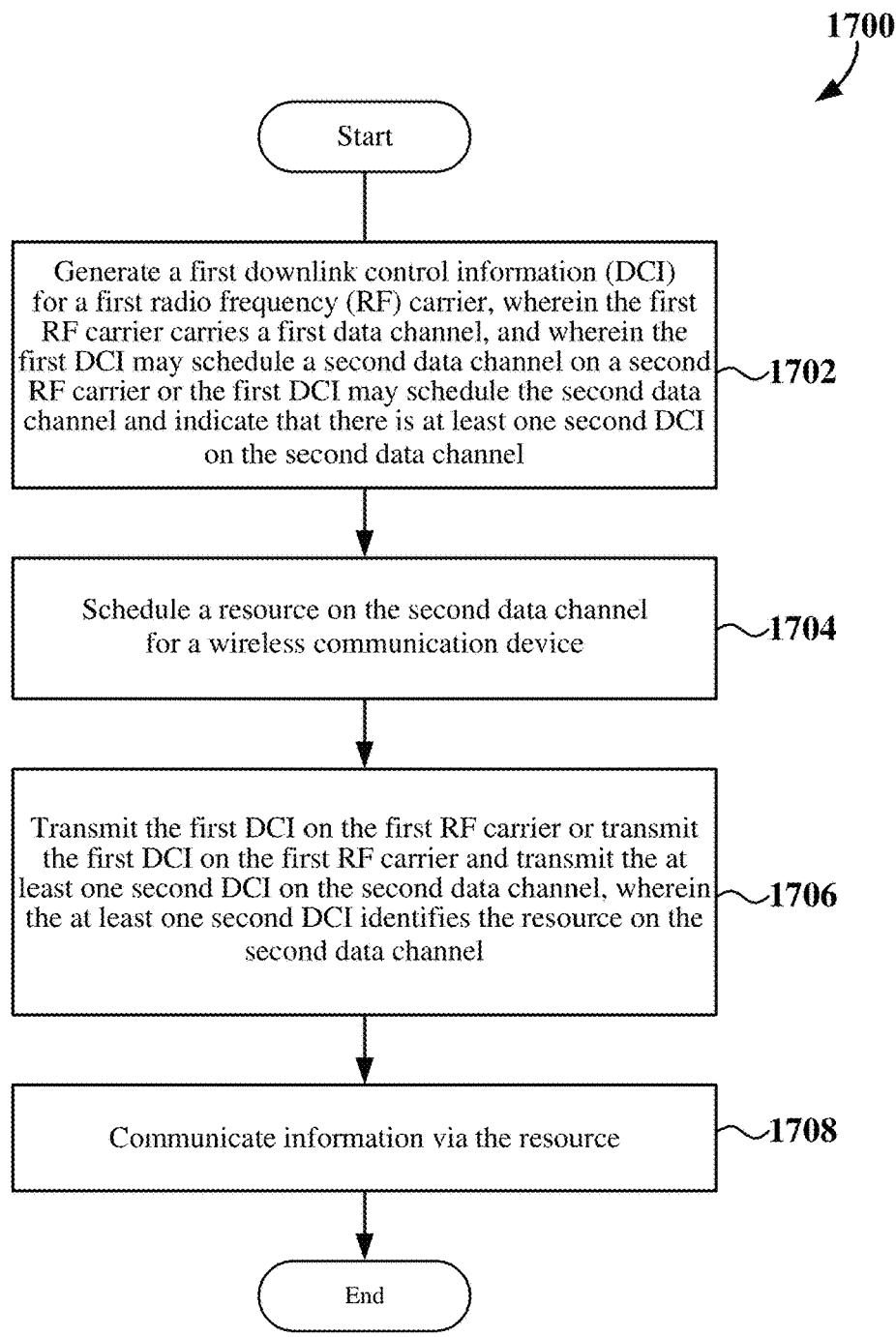
FIG. 17 is a flow chart illustrating an example wireless communication method for cross-carrier scheduling of multiple DCIs on a data channel according to some aspects.

In some examples, the DCI generation circuitry 1642, the scheduling circuitry 1643, the communication and processing circuitry 1641, and the transceiver 1610 may cooperate to provide a fifth wireless communication method (e.g., the method 1700 of FIG. 17). In some examples, the scheduling circuitry 1643 may be configured to schedule a resource for a user equipment on a component carrier. In some examples, the DCI generation circuitry 1642 may be configured to generate a DCI that includes one of more of the fields (e.g., for cross-carrier scheduling) as discussed herein and identifies the resource. In some examples, the DCI generation circuitry 1642 in cooperation with the communication and processing circuitry 1641 and the transceiver 1610 may be configured to send the DCI to the user equipment. In some examples, the communication and processing circuitry 1641 and the transceiver 1610 may be configured to send information to and/or receive information from a user equipment via the resource.

FIG. 17 is a flow chart illustrating an example method 1700 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the base station 1600 illustrated in FIG. 16. In some examples, the method 1700 may be carried out by any suitable apparatus or means for carrying out the functions or algorithm described below.

At block 1702, a base station (BS) may generate a first downlink control information (DCI) for a first radio frequency (RF) carrier. In some examples, the first RF carrier may carry (e.g., transport or otherwise include) a first data channel. The first DCI may schedule a second data channel on a second RF carrier or the first DCI may schedule the second data channel and indicate that there is at least one second DCI on the second data channel. In some examples, the DCI generation circuitry 1642, shown and described above in connection with FIG. 11, may provide a means to generate a first DCI for a first RF carrier.

The first DCI may include one or more indications in different examples. In some examples, the first DCI may include an indication of how many DCIs are carried by the second data channel. In some examples, the first DCI may include an indication of at least one code rate offset factor for the at least one second DCI.

The first DCI and the at least one second DCI may have similar formats in some examples. In some examples, the first DCI may be based on a first DCI format and the at least one second DCI may be based on the first DCI format. In some examples, the first DCI may have a first length and the at least one second DCI may have the first length.

The RF carriers may be millimeter wave (mmW) carriers in some examples. For example, the first RF carrier may be a first mmW carrier and the second RF carrier may be a second mmW carrier.

In some examples, the BS may transmit the first DCI on a first control channel of the first RF carrier. In some examples, the BS may configure a plurality of component carriers for the user equipment. In some examples, the first RF carrier may be a scheduling component carrier of the plurality of component carriers and the second RF carrier may be a scheduled component carrier of the plurality of component carriers In some examples, the BS may transmit the first DCI on the first data channel of the first RF carrier. In some examples, the BS may configure a plurality of component carriers for the user equipment. In some examples, the first RF carrier may be a scheduling component carrier of the plurality of component carriers and the second RF carrier may be a scheduled component carrier of the plurality of component carriers.

At block 1704, the BS may schedule a resource on the second data channel for a user equipment. In some examples, the scheduling circuitry 1643, shown and described above in connection with FIG. 11, may provide a means to schedule a resource on the second data channel for a user equipment.

At block 1706, the BS may transmit the first DCI on the first RF carrier or transmit the first DCI on the first RF carrier and transmit the at least one second DCI on the second data channel, wherein the at least one second DCI identifies the resource on the second data channel. In some examples, the DCI generation circuitry 1642 in cooperation with the communication and processing circuitry 1641 and the transceiver 1610, shown and described above in connection with FIG. 16, may provide a means to transmit the first DCI on the first RF carrier. In some examples, the DCI generation circuitry 1642 in cooperation with the communication and processing circuitry 1641 and the transceiver 1610 may provide a means to transmit the first DCI on the first RF carrier and transmit the at least one second DCI on the second data channel.

At block 1708, the BS may communicate information via the resource. In some examples, the communication and processing circuitry 1641 and the transceiver 1610, shown and described above in connection with FIG. 16, may provide a means to communicate information via the resource.

In some examples, the BS may generate a third DCI that indicates that at least one fourth DCI is on the first data channel of the first RF carrier and transmit the third DCI on a first control channel of the second RF carrier. In some examples, the BS may configure a plurality of component carriers for the user equipment. In some examples, the second RF carrier may be a scheduling component carrier of the plurality of component carriers and the first RF carrier may be a scheduled component carrier of the plurality of component carriers.

In some examples, the BS may transmit the first DCI on the first data channel of the first RF carrier. In some examples, the at least one fourth DCI may include the first DCI. The third DCI and the at least one fourth DCI may have similar formats in some examples. In some examples, the third DCI may be based on a first DCI format and the at least one fourth DCI may be based on the first DCI format. In some examples, the third DCI may have a first length and the at least one fourth DCI may have the first length.

In one configuration, the base station 1600 includes means for generating a first downlink control information (DCI) for a first radio frequency (RF) carrier, means for scheduling a resource on the second data channel for a user equipment, means for transmitting the first DCI on the first RF carrier, means for transmitting the first DCI on the first RF carrier and the at least one second DCI on the second data channel, and means for communicating information via the resource. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 5, and 10, and utilizing, for example, the processes and/or algorithms described herein in relation to FIG. 17.

The methods shown in FIGS. 12-15 and 17 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving a first downlink control information (DCI) on a first radio frequency (RF) carrier of a plurality of component carriers for the user equipment, wherein the first DCI schedules a first data channel on a second RF carrier of the plurality of component carriers; receiving a second DCI on the second RF carrier; identifying at least one resource based on at least one of: the first DCI, the second DCI, or a combination thereof; and communicating information via the at least one resource.

Aspect 2: The method of aspect 1, wherein: the receiving the first DCI comprises receiving the first DCI on a first control channel on the first RF carrier.

Aspect 3: The method of aspect 1 or 2, wherein: the receiving the first DCI comprises receiving the first DCI on a second data channel on the first RF carrier.

Aspect 4: The method of any of aspects 1 through 3, wherein: the first DCI indicates that the second DCI is on a second data channel on the second RF carrier.

Aspect 5: The method of any of aspects 1 through 4, wherein: the second DCI schedules a second data channel on the second RF carrier.

Aspect 6: The method of any of aspects 1 through 5, wherein: the second DCI schedules a second data channel on the first RF carrier.

Aspect 7: The method of any of aspects 1 through 6, wherein: the second DCI indicates that a third DCI is carried by the second RF carrier.

Aspect 8: The method of any of aspects 1 through 7, wherein: a third DCI on the first RF carrier schedules a second data channel on the first RF carrier.

Aspect 9: The method of any of aspects 1 through 8, wherein: a third DCI on the first RF carrier indicates that a fourth DCI is carried by a second data channel on the first RF carrier.

Aspect 10: The method of any of aspects 1 through 9, wherein: the first RF carrier is a scheduling component carrier of the plurality of component carriers; and the second RF carrier is a scheduled component carrier of the plurality of component carriers.

Aspect 11: The method of any of aspects 1 through 10, wherein: the first DCI is based on a first DCI format; and the second DCI is based on the first DCI format.

Aspect 12: The method of any of aspects 1 through 11, wherein: the first DCI has a first length; and the second DCI has the first length.

Aspect 13: The method of any of aspects 1 through 12, wherein the first DCI comprises an indication of how many DCIs are carried by the second RF carrier.

Aspect 14: The method of any of aspects 1 through 13, wherein the first DCI comprises an indication of at least one code rate offset factor for the second DCI.

Aspect 16: A method for wireless communication at a user equipment, the method comprising: receiving a first downlink control information (DCI) on a first data channel of a first radio frequency (RF) carrier of a plurality of component carriers for the user equipment, wherein the first DCI schedules a second data channel on a second RF carrier of the plurality of component carriers; identifying at least one resource associated with the second data channel; and communicating information via the at least one resource.

Aspect 17: The method of aspect 16, wherein: the first DCI schedules a third data channel on the first RF carrier.

Aspect 18: The method of any of aspects 16 through 17, further comprising: receiving a second DCI on a first control channel of the first RF carrier, wherein the second DCI schedules a third data channel on the second RF carrier.

Aspect 19: The method of any of aspects 16 through 18, further comprising: receiving a second DCI on a first control channel of the first RF carrier, wherein the second DCI schedules a third data channel on the first RF carrier.

Aspect 20: The method of any of aspects 16 through 19, further comprising: receiving a second DCI on a first control channel of the first RF carrier, wherein the second DCI indicates that a third DCI is carried by a third data channel on the first RF carrier.

Aspect 21: The method of any of aspects 16 through 20, wherein: the first RF carrier is a scheduling component carrier of the plurality of component carriers; and the second RF carrier is a scheduled component carrier of the plurality of component carriers.

Aspect 22: The method of any of aspects 16 through 21, wherein: the first RF carrier is a scheduled component carrier of the plurality of component carriers; and the second RF carrier is a scheduling component carrier of the plurality of component carriers.

Aspect 23: The method of any of aspects 16 through 22, further comprising: receiving a second DCI on the second RF carrier.

Aspect 24: The method of aspect 23, wherein: the first DCI indicates that the second DCI is carried by the second data channel on the second RF carrier.

Aspect 25: The method of any of aspects 23 through 24, further comprising: receiving a third DCI on a first control channel of the first RF carrier, wherein the third DCI indicates that the second DCI is carried by a third data channel on the second RF carrier.

Aspect 26: The method of any of aspects 23 through 25, wherein: the second DCI schedules a third data channel on the second RF carrier.

Aspect 27: The method of any of aspects 23 through 26, wherein: the second DCI indicates that a third DCI is carried by a third data channel of the second RF carrier.

Aspect 28: The method of any of aspects 23 through 27, wherein: the second DCI schedules a third data channel on the first RF carrier.

Aspect 29: The method of any of aspects 23 through 28, wherein: the first DCI comprises a first indication of how many DCIs are carried by the second RF carrier, the first DCI comprises a second indication of at least one code rate offset factor for the second DCI, or the first DCI comprises the first indication and the second indication.

Aspect 30: A user equipment comprising: a transceiver configured to communicate with a radio access network, a memory, and a processor communicatively coupled to the transceiver and the memory, wherein the processor and the memory are configured to perform any one of aspects 1 through 15.

Aspect 31: An apparatus configured for wireless communication comprising at least one means for performing any one of aspects 1 through 15.

Aspect 32: A non-transitory computer-readable medium storing computer-executable code, comprising code for causing an apparatus to perform any one of aspects 1 through 15.

Aspect 33: A user equipment comprising: a transceiver, a memory, and a processor communicatively coupled to the transceiver and the memory, wherein the processor and the memory are configured to perform any one of aspects 16 through 29.

Aspect 34: An apparatus configured for wireless communication comprising at least one means for performing any one of aspects 16 through 29.

Aspect 35: A non-transitory computer-readable medium storing computer-executable code, comprising code for causing an apparatus to perform any one of aspects 16 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 10, 11, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:
   receiving a first downlink control information (DCI) on a first radio frequency (RF) carrier of a plurality of component carriers for the user equipment, wherein the first DCI schedules a first data channel on a second RF carrier of the plurality of component carriers;
   receiving a second DCI on the first data channel on the second RF carrier;
   identifying at least one resource based on at least one of: the first DCI, the second DCI, or a combination thereof; and
   communicating information via the at least one resource.

2. The method of claim 1, wherein:
   the receiving the first DCI comprises receiving the first DCI on a first control channel on the first RF carrier.

3. The method of claim 1, wherein:
   the receiving the first DCI comprises receiving the first DCI on a second data channel on the first RF carrier.

4. The method of claim 1, wherein:
   the second DCI schedules a second data channel on the second RF carrier.

5. The method of claim 1, wherein:
   the second DCI schedules a second data channel on the first RF carrier.

6. The method of claim 1, wherein:
   the second DCI indicates that a third DCI is carried by the second RF carrier.

7. The method of claim 1, wherein:
   a third DCI on the first RF carrier schedules a second data channel on the first RF carrier.

8. The method of claim 1, wherein:
   a third DCI on the first RF carrier indicates that a fourth DCI is carried by a second data channel on the first RF carrier.

9. The method of claim 1, wherein:
   the first RF carrier is a scheduling component carrier of the plurality of component carriers; and
   the second RF carrier is a scheduled component carrier of the plurality of component carriers.

10. The method of claim 1, wherein:
    the first DCI is based on a first DCI format; and
    the second DCI is based on the first DCI format.

11. The method of claim 1, wherein:
    the first DCI has a first length; and
    the second DCI has the first length.

12. The method of claim 1, wherein the first DCI comprises an indication of how many DCIs are carried by the second RF carrier.

13. The method of claim 1, wherein the first DCI comprises an indication of at least one code rate offset factor for the second DCI.

14. A user equipment, comprising:
    a transceiver;
    a memory; and
    a processor communicatively coupled to the transceiver and the memory, wherein the processor and the memory are configured to:
      receive a first downlink control information (DCI) via the transceiver on a first radio frequency (RF) carrier of a plurality of component carriers for the user equipment, wherein the first DCI schedules a first data channel on a second RF carrier of the plurality of component carriers;
      receive a second DCI via the transceiver on the first data channel on the second RF carrier;

identify at least one resource based on at least one of: the first DCI, the second DCI, or a combination thereof; and
communicate information via the transceiver on the at least one resource.

15. A method for wireless communication at a user equipment, the method comprising:
receiving a first downlink control information (DCI) on a first data channel of a first radio frequency (RF) carrier of a plurality of component carriers for the user equipment, wherein the first DCI schedules a second data channel on a second RF carrier of the plurality of component carriers;
identifying at least one resource associated with the second data channel; and
communicating information via the at least one resource.

16. The method of claim 15, wherein:
the first DCI schedules a third data channel on the first RF carrier.

17. The method of claim 15, further comprising:
receiving a second DCI on a first control channel of the first RF carrier, wherein the second DCI schedules a third data channel on the second RF carrier.

18. The method of claim 15, further comprising:
receiving a second DCI on a first control channel of the first RF carrier, wherein the second DCI schedules a third data channel on the first RF carrier.

19. The method of claim 15, further comprising:
receiving a second DCI on a first control channel of the first RF carrier, wherein the second DCI indicates that a third DCI is carried by a third data channel on the first RF carrier.

20. The method of claim 15, wherein:
the first RF carrier is a scheduling component carrier of the plurality of component carriers; and
the second RF carrier is a scheduled component carrier of the plurality of component carriers.

21. The method of claim 15, wherein:
the first RF carrier is a scheduled component carrier of the plurality of component carriers; and
the second RF carrier is a scheduling component carrier of the plurality of component carriers.

22. The method of claim 15, further comprising:
receiving a second DCI on the second RF carrier.

23. The method of claim 22, wherein:
the first DCI indicates that the second DCI is carried by the second data channel on the second RF carrier.

24. The method of claim 22, further comprising:
receiving a third DCI on a first control channel of the first RF carrier, wherein the third DCI indicates that the second DCI is carried by a third data channel on the second RF carrier.

25. The method of claim 22, wherein:
the second DCI schedules a third data channel on the second RF carrier.

26. The method of claim 22, wherein:
the second DCI indicates that a third DCI is carried by a third data channel of the second RF carrier.

27. The method of claim 22, wherein:
the second DCI schedules a third data channel on the first RF carrier.

28. The method of claim 22, wherein:
the first DCI comprises a first indication of how many DCIs are carried by the second RF carrier, the first DCI comprises a second indication of at least one code rate offset factor for the second DCI, or the first DCI comprises the first indication and the second indication.

29. A user equipment, comprising:
a transceiver;
a memory; and
a processor communicatively coupled to the transceiver and the memory, wherein the processor and the memory are configured to:
receive a first downlink control information (DCI) via the transceiver on a first data channel of a first radio frequency (RF) carrier of a plurality of component carriers for the user equipment, wherein the first DCI schedules a second data channel on a second RF carrier of the plurality of component carriers;
identify at least one resource associated with the second data channel; and
communicate information via the transceiver on the at least one resource.

* * * * *